United States Patent
Learned et al.

(10) Patent No.: US 10,091,798 B2
(45) Date of Patent: Oct. 2, 2018

(54) COGNITIVE RADIO METHOD AND APPARATUS FOR ACHIEVING AD HOC INTERFERENCE MULTIPLE ACCESS WIRELESS COMMUNICATION

(71) Applicant: Massachusetts Institute of Technology, Cambridge, MA (US)

(72) Inventors: Rachel E. Learned, Waltham, MA (US); Nicholas J. Kaminski, Blacksburg, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/618,848

(22) Filed: Jun. 9, 2017

(65) Prior Publication Data

US 2017/0280463 A1  Sep. 28, 2017

Related U.S. Application Data

(62) Division of application No. 14/437,882, filed on Apr. 23, 2015, now Pat. No. 9,693,361.
(Continued)

(51) Int. Cl.
*H04W 72/08* (2009.01)
*H04L 27/00* (2006.01)
(Continued)

(52) U.S. Cl.
CPC .............. *H04W 72/082* (2013.01); *H04L 5/00* (2013.01); *H04L 27/0006* (2013.01);
(Continued)

(58) Field of Classification Search
CPC .............. H04L 27/0006; H04W 16/14; H04W 72/082; H04W 84/18
See application file for complete search history.

(56) References Cited

U.S. PATENT DOCUMENTS 6,487,414 B1  11/2002  Tanay et al.
6,704,376 B2   3/2004  Mills et al.
(Continued)

FOREIGN PATENT DOCUMENTS

WO  WO 2010/066289 A1  6/2010
WO  WO 2011/006116 A1  1/2011
(Continued)

OTHER PUBLICATIONS

U.S. Appl. No. 15/522,844, filed Apr. 28, 2017, Learned, et al.
(Continued)

*Primary Examiner* — Kan Yuen
(74) *Attorney, Agent, or Firm* — Daly, Crowley, Mofford & Durkee LLP

(57) ABSTRACT

An SUOC radio employs: (1) Spectrum sensing and parameter estimation methods to characterize potential FUOCs; (2) A rate pair prediction tool to guide it's choice of FUOC to target along with the appropriate rate pair (SUOC and FUOC achievable rates); (3) Machine learning methods to automatically and on the fly advantage experience/history; (4) A decision maker with multiple possible procedures that govern steps of interaction; (5) Multiuser detection receiver to deal with the interference once information-bearing transmission has commenced by the SUOC radios. (6) a radio capable of full transmit-processing chain to accomplish modulation and full receive-processing chain to accomplish demodulation, as well as other radio functions necessary for successful wireless communications such as medium access control, networking and other functions.

18 Claims, 16 Drawing Sheets

Related U.S. Application Data

(60) Provisional application No. 61/723,639, filed on Nov. 7, 2012.

(51) Int. Cl.
*H04W 16/14* (2009.01)
*H04L 5/00* (2006.01)
*H04W 52/26* (2009.01)
*H04W 52/36* (2009.01)
*H04W 52/24* (2009.01)
*H04W 52/34* (2009.01)
*H04W 72/04* (2009.01)

(52) U.S. Cl.
CPC ......... *H04W 16/14* (2013.01); *H04W 52/267* (2013.01); *H04W 52/367* (2013.01); *H04W 52/243* (2013.01); *H04W 52/343* (2013.01); *H04W 72/0453* (2013.01)

(56) References Cited

U.S. PATENT DOCUMENTS

| | | | |
|---|---|---|---|
| 6,947,505 | B2 | 9/2005 | Learned |
| 7,031,266 | B1 | 4/2006 | Patel et al. |
| 7,058,422 | B2 | 6/2006 | Learned et al. |
| 7,085,575 | B2 | 8/2006 | Fabien et al. |
| 7,092,452 | B2 | 8/2006 | Taylor et al. |
| 7,126,890 | B2 | 10/2006 | Learned et al. |
| 7,190,743 | B2 | 3/2007 | Learned |
| 7,218,690 | B2 | 5/2007 | Learned |
| 7,269,223 | B2 | 9/2007 | Learned et al. |
| 7,558,238 | B1 | 7/2009 | Sun et al. |
| 7,593,473 | B2 | 9/2009 | Learned et al. |
| 7,593,492 | B1 | 9/2009 | Lande |
| 7,724,851 | B2 | 5/2010 | Learned et al. |
| 7,738,906 | B2 | 6/2010 | Attar et al. |
| 9,148,804 | B2 | 9/2015 | Learned |
| 2001/0028675 | A1 | 10/2001 | Bierly et al. |
| 2002/0002052 | A1 | 1/2002 | McHenry |
| 2002/0122413 | A1 | 9/2002 | Shoemake |
| 2004/0018843 | A1 | 1/2004 | Cerwall et al. |
| 2004/0082363 | A1 | 4/2004 | Hosein |
| 2004/0235472 | A1 | 11/2004 | Fujishima et al. |
| 2005/0124347 | A1 | 6/2005 | Hosein |
| 2005/0201280 | A1 | 9/2005 | Lundby et al. |
| 2007/0086379 | A1* | 4/2007 | Takayanagi ........... H04W 88/08 370/329 |
| 2008/0089279 | A1 | 4/2008 | Hu et al. |
| 2008/0198828 | A1 | 8/2008 | Reznik et al. |
| 2008/0293353 | A1 | 11/2008 | Mody et al. |
| 2009/0154534 | A1 | 6/2009 | Hassan |
| 2009/0190566 | A1* | 7/2009 | Kwon ................... H04W 74/02 370/345 |
| 2009/0258597 | A1 | 10/2009 | Chen et al. |
| 2010/0124930 | A1 | 5/2010 | Andrews et al. |
| 2010/0142465 | A1 | 6/2010 | Medepalli et al. |
| 2010/0165956 | A1 | 7/2010 | Razzell |
| 2010/0289688 | A1 | 11/2010 | Sherman et al. |
| 2010/0304770 | A1 | 12/2010 | Wietfeldt et al. |
| 2011/0021153 | A1 | 1/2011 | Safavi |
| 2011/0093540 | A1 | 4/2011 | Eisenberg et al. |
| 2011/0176508 | A1 | 7/2011 | Altintas et al. |
| 2011/0286351 | A1 | 11/2011 | Reudink |
| 2012/0039183 | A1 | 2/2012 | Barbieri et al. |
| 2012/0069941 | A1 | 3/2012 | Herbig |
| 2012/0071102 | A1* | 3/2012 | Palomar ................ H04W 16/14 455/63.1 |
| 2012/0108276 | A1 | 5/2012 | Lang et al. |
| 2012/0208571 | A1* | 8/2012 | Park .................... H04L 67/1063 455/466 |
| 2013/0035108 | A1 | 2/2013 | Joslyn et al. |
| 2013/0244681 | A1 | 9/2013 | Ookubo et al. |
| 2014/0293867 | A1 | 10/2014 | Horiuchi et al. |
| 2014/0314003 | A1 | 10/2014 | Zhou et al. |
| 2014/0348004 | A1 | 11/2014 | Ponnuswamy |
| 2015/0049721 | A1 | 2/2015 | Wijting et al. |
| 2015/0282176 | A1 | 10/2015 | MacLeod et al. |
| 2015/0282189 | A1 | 10/2015 | Learned et al. |

FOREIGN PATENT DOCUMENTS

| | | |
|---|---|---|
| WO | WO 2011/055319 A1 | 5/2011 |
| WO | WO 2013/185150 A1 | 12/2013 |
| WO | WO 2014/052992 A1 | 4/2014 |
| WO | WO 2016/053406 A1 | 4/2016 |
| WO | WO 2016/053406 A9 | 5/2016 |
| WO | WO 2016/114844 A2 | 7/2016 |

OTHER PUBLICATIONS

Ahmed, et al.; "Entropy Expressions and Their Estimators for Multivariate Distributions;" IEEE Transactions on Information Theory; vol. 35; No. 3; May 1989; pp. 688-692.

Bahl, et al.; "Optimal Decoding of Linear Codes for Minimizing Symbol Error Rate;" IEEE Transactions on Information Theory; Mar. 1974; pp. 284-287.

Learned; "Making Optimal Use of the Asymmetric Inference Channel;" IEEE; Signals, Systems and Computers (Asilomar); Nov. 6-9, 2011; pp. 1722-1727.

Learned; "Making Optimal Use of the Asymmetric Interference Channel;" Asilomar Conference on Signals, Systems, and Computing; Presentation; Nov. 8, 2011; 63 pages.

Neeser, et al.; "Proper Complex Random Processes with Applications to Information Theory;" IEEE Transactions on Information Theory; vol. 39; No. 4; Jul. 1993; pp. 1293-1302.

Pham; "Fast Algorithms for Mutual Information Based Independent Component Analysis;" IEEE Transactions on Signal Processing; vol. 52; No. 10; Oct. 2004; pp. 2690-2700.

Tufts; "Design Problems in Pulse Transmission;" Technical Report 368; Massachusetts Institute of Technology; Jul. 28, 1960; 52 pages.

Tufts; "Nyquist's Problem—The Joint Optimization of Transmitter and Receiver in Pulse Amplitude Modulation;" Proceedings of the IEEE: vol. 53; Issue 3; pp. 248-259.

Ungerboeck; "Channel Coding with Multilevel/Phase Signals;" IEEE Transactions on Information Theory; vol. IT-28; No. 1; Jan. 1982; pp. 55-67.

Verdu; "The Capacity Region of the Symbol-Asynchronous Gaussian Multiple-Access Chanel;" IEEE Transactions on Information Theory; vol. 35; No. 4; Jul. 1989; pp. 733-751.

PCT International Search Report and Written Opinion for International App. No. PCT/US13/47026 dated Oct. 2, 2013; 16 Pages.

PCT International Search Report and Written Opinion for International App. No. PCT/US13/68710 dated Jan. 7, 2014; 15 Pages.

PCT International Search Report and Written Opinion for International App. No. PCT/US2013/031900 dated Jan. 15, 2014; 12 Pages.

Office Action dated Feb. 4, 2015 for U.S. Appl. No. 13/998,566; 9 Pages.

Response to Office Action dated Feb. 4, 2015 corresponding to U.S. Appl. No. 13/998,566; Response filed on May 4, 2015; 8 Pages.

PCT International Preliminary Report on Patentability of the ISA for Appl. No. PCT/US2013/031900 dated May 21, 2015; 9 Pages.

PCT International Preliminary Report on Patentability of the ISA for Appl. No. PCT/US2013/068710 dated May 21, 2015; 9 Pages.

Notice of Allowance dated Jun. 8, 2015 for U.S. Appl. No. 13/998,566; 17 Pages.

PCT International Preliminary Report on Patentability of the ISA dated Sep. 24, 2015 for Appl. No. PCT/US2013/047026; 11 Pages.

PCT International Search Report and Written Opinion dated Feb. 26, 2016 for International App. No. PCT/US15/35963; 11 Pages.

PCT International Search Report and Written Opinion dated Jul. 15, 2016 for International App. No. PCT/US15/58586; 12 Pages.

U.S. Restriction Requirement dated Aug. 16, 2016 corresponding to U.S. Appl. No. 14/437,350; 7 Pages.

Office Action dated Sep. 9, 2016 from U.S. Appl. No. 14/585,780; 27 Pages.

(56) References Cited

OTHER PUBLICATIONS

Response to U.S. Restriction Requirement dated Aug. 16, 2016 corresponding to U.S. Appl. No. 14/437,350, filed Sep. 12, 2016; 1 Page.
Office Action dated Sep. 29, 2016 from U.S. Appl. No. 14/437,350; 19 Pages.
Office Action dated Oct. 12, 2016 from U.S. Appl. No. 14/648,049; 43 Pages.
U.S. Restriction Requirement dated Nov. 9, 2016 corresponding to U.S. Appl. No. 14/437,882; 7 Pages.
Response to U.S. Restriction Requirement dated Nov. 9, 2016 corresponding to U.S. Appl. No. 14/437,882, filed Nov. 29, 2016; 1 Page.
Response to Office Action dated Sep. 9, 2016 from U.S. Appl. No. 14/585,780, filed Dec. 7, 2016; 6 Pages.
Response to Office Action dated Sep. 29, 2016 from U.S. Appl. No. 14/437,350, filed Dec. 19, 2016; 8 Pages.
PCT International Preliminary Report on Patentability of the ISA dated Dec. 29, 2016 from International App. No. PCT/US2015/035963; 7 Pages.
Office Action dated Jan. 5, 2017 from U.S. Appl. No. 14/437,882; 24 Pages.
Response to Office Action dated Jan. 5, 2017 from U.S. Appl. No. 14/437,882, filed Jan. 31, 2017; 13 Pages.
Response to Office Action dated Oct. 12, 2016 from U.S. Appl. No. 14/648,049, filed Jan. 31, 2017; 13 Pages.
Office Action dated Mar. 14, 2017 from U.S. Appl. No. 14/648,049; 35 Pages.
Notice of Allowance dated Mar. 22, 2017 from U.S. Appl. No. 14/585,780; 14 Pages.
Notice of Allowance dated Apr. 4, 2017 from U.S. Appl. No. 14/437,882; 11 Pages.
PCT International Preliminary Report on Patentability of the ISA dated May 18, 2017 from International App. No. PCT/US2015/058586; 6 Pages.
Final Office Action dated Sep. 12, 2017 from U.S. Appl. No. 14/648,049; 43 Pages.
Response to Office Action dated Apr. 14, 2017 as filed on Jul. 14, 2017 from U.S. Appl. No. 14/648,049; 17 Pages.
Request for Continued Examination (RCE) and Response to Final Office Action dated Sep. 12, 2017 for U.S. Appl. No. 14/648,049; RCE and Response filed on Feb. 12, 2018; 20 Pages.
Notice of Allowance dated Mar. 27, 2018 for U.S. Appl. No. 14/648,049; 9 pages.
Non-Final Office Action dated Jul. 18, 2018 for U.S. Appl. No. 15/317,750, 32 pages.

\* cited by examiner

COGNITIVE RADIO METHOD AND APPARATUS FOR ACHIEVING AD HOC INTERFERENCE MULTIPLE ACCESS WIRELESS COMMUNICATION

CROSS REFERENCE TO RELATED APPLICATIONS

This application is a Divisional of co-pending U.S. patent application Ser. No. 14/437,882 filed on Apr. 23, 2015 which claims the benefit, under 35 U.S.C. § 119(e), of Provisional application No. 61/723,639 filed Nov. 7, 2012 which application is hereby incorporated herein by reference in its entirety.

STATEMENT REGARDING FEDERALLY SPONSORED RESEARCH

This invention was made with government support under Contract No. FA8721-05-C-0002 awarded by the U.S. Air Force. The government has certain rights in the invention.

FIELD

The concepts described herein relate generally to wireless communication, and more particularly to cognitive radio systems and techniques for achieving ad hoc wireless communications in the presence of other user interference (sometimes referred to herein as "interference multiple access wireless communications").

BACKGROUND

As is known in the art, different wireless networks and/or systems of radios avoid interfering with each other by various options. For example, some systems rely on pre-arrangement or careful assignment of frequency bands, time slots, or signature pulses as is done for cellular systems through frequency reuse maps and TDMA for GSM, OFDMA for LTE, spread spectrum for IS-95, and combinations of these for WCDMA through HSPA commercial cellular standards. Other systems utilize collision avoidance techniques such as those employed for a-packet based systems such as 802.11/16/22 (WiFi and WiMax) where collisions are controlled as part of a multiple access medium access control procedure (e.g. carrier sense multiple access). Still other systems utilize on the fly interference assessment and avoidance is used in the new, currently operational paradigm for "cognitive radio" via dynamic spectrum access (DSA) for the newly allowed "secondary" user (see IEEE SCC41: Standards for Dynamic Spectrum Access Networks). This is done by the system of "secondary user" radios actively sensing the radio spectrum and coordinating to choose an empty band for transmission.

The existing systems, however, all fail if they are unable to avoid interference.

As the consumer market continues to rise for smart phones and wireless data service, the demand for more and more throughput increases drastically and the radio spectrum continues to become more crowded. A new paradigm in wireless communication is emerging where radios can be built to withstand interference to the level where interference is no longer avoided. Interference is allowed, even invited, to allow for more wireless devices to make use of the scarce free space in the wireless spectrum. For example, the LTE Advanced standard (to support the HetNet feature) allows, even encourages, interference. If this new feature is enabled, reliable performance would require mobiles to have some kind of interference mitigation in the receivers.

Conventional cognitive networks adapt at a network/routing layer, not the physical layer. Such networks typically learn which network nodes are having trouble sending packets through them and then they start to change how they route the packets. This conventional type of cognitive network does not invite or encourage interference; it simply does the best it can to avoid using links that are hindered by interference. The subject of this invention, in contrast, purposely seeks out opportunities to create interference, but to do so in an intelligent way that takes advantage of the situation and device protocols and capabilities at hand along with making use of advanced processing and sensing technology so as to enable high throughputs for its own link as well as the link with which it simultaneously shares the band.

SUMMARY

As used herein, the phrases "co-existence cognitive radio" and "cognitive co-existence radio" generally refer to an intelligent wireless communication system that is aware of its surrounding environment (i.e., outside world), senses the RF environment to which it is exposed, computes feature parameters from sensed RF signals, makes decisions based upon calculations involving the RF features along with learned features acquired from gained understanding of the environment's behavior in reaction to emissions from the said cognitive coexistence radio. Further, the cognitive co-existence radio adapts its internal states to sensed variations in the RF signals transmitted by others in the environment and makes corresponding changes in certain operating parameters (e.g., transmit-power, carrier-frequency, and modulation strategy) in real-time to have a desired effect upon the emitting devices and their corresponding links as well as a desired effect upon its own link. Often, such changes are made with two primary objectives in mind: (1) to provide highly reliable communications whenever and wherever needed; and (2) to provide efficient utilization of the radio spectrum. Networks which include such co-existence cognitive radios are referred to herein as cognitive networks The concepts, systems, circuit and techniques described herein find use in a wide variety of application areas including, but not limited to wireless communication such as that provided by the 4G (LTE) cellular, 802.11 (WiFi), or 802.16 (WiMax) wireless standard and equipment. Since wireless communications with MIMO (multiple input, multiple output) receiver algorithms may be similar mathematically to MUD algorithms, the concepts systems and techniques described herein may be applied to radios that employ MIMO transmission/reception schemes. Furthermore, the concepts, systems and techniques described herein may be applied to systems and techniques for storage on magnetic media (e.g. since magnetic storage readers "see" adjacent tracks in addition to the tracks they are trying to read). This adjacent track interference is mathematically similar to the interference referred to herein as a FUOC signal. Further still, the concepts. systems and techniques described herein may be applied to signals propagating on a cable (e.g. since receivers closer to a transmitting hub station receive a stronger signal than receivers farther away from the hub station and thus the closer receivers can "see" embedded interfering signal in the presence of the stronger signal that was actually meant for the receivers that are farther away from the transmitting hub.)

It should be appreciated that, in general, the concepts, systems and techniques described herein allow different wireless networks and/or radios to co-exist in the same frequency band at the same time, causing interference with one another (i.e. they will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same band.

The concepts, systems and techniques described herein enable backward compatible operation with radios that do not possess the capabilities of this invention, where the older radios would maintain high functionality in the presence of the impeded "spectrum share."

In accordance with the concepts, systems and techniques described herein a co-existence cognitive radio that enables use of frequency spectrum already being used by other radios includes (a) a transmit antenna adapted to transmit radio frequency (RF) signals; (b) a receive antenna adapted to receive RF signals and to provide a received RF signal at an output thereof; (c) an RF characterization unit coupled to receive RF signals from the receive antenna; (d) a rate determination unit coupled to receive signals from the RF characterization unit; (e) a decision making unit coupled to receive signals from both the rate determination unit and the RF characterization unit and to provide signals to the rate determination unit; and (f) a communication system radio coupled to receive signals from the receive antenna, the RF characterization unit, and the decision making unit and coupled to provide to the receive antenna a bit stream of a signal of interest from a Second User On Channel (SUOC).

With this particular arrangement, a co-existence cognitive radio capable of assessing a frequency spectrum, determining candidate bands in which other independent radios are operating, and successfully sharing access of a band with an independent radio system is provided.

The co-existence cognitive radio successfully transmits and receives in the pre-occupied band without detrimental harm to the pre-existing radio system that was already operating in that band. Moreover, the pre-existing radio system already operating in that band requires no additional capabilities to co-exist with the co-existencecognitive radio described herein. Specifically, the pre-existing radio system is not expected to communicate with the subject radio to accomplish the virtual negotiation to settle upon an agreeable co-existence of the two systems. Thus, use of co-existence cognitive radios as described herein alleviates spectrum congestion problem that plague conventional existing commercial wireless systems.

A wireless communication network including one or more co-existence cognitive radios allows different wireless networks and/or radios to co-exist in the same frequency band at the same time (i.e. radios are intentionally allowed to interfere with one another).

The system also enables different interfering networks/systems to co-operate within a band without requiring pre-specified coordination/cooperation protocols or means of direct communication with each other to negotiate a rate pair or other means for maintaining successful communication in the presence of each other's interference.

In accordance with another aspect of the concepts, systems and techniques described herein, in a network having one or more First User On Channel (FUOC) radios and one or more SUOC radios, a method for achieving ad hoc interference multiple access wireless communication in an SUOC radio, the method including (a) establishing a list of network member SUOC radios to which it must establish a co-existence link; (b) scanning an RF spectrum and looking for one or more suitable FUOCs with which to coexist; (c) iterating via probe signal emissions on rates and powers until a suitable rate and power is reached that allows for acceptable coexistence with a previously determined suitable FUOC/s; and (d) in response to an acceptable rate and power being found, transitioning the SUOC to a communication state in which the SUOC sends and receives data signals from other SUOCs in its network and wherein an advanced error correction code, MIMO, and/or advanced processing receiver is employed to mitigate interference caused by FUOC signals which interfere with the SUOC signals of interest; (e) wherein the advance processing receiver employs algorithms such as multiuser detection, beam forming, and/or MIMO algorithms; (f) and in the event the power/rate iteration initiated by the SUOC on the previously determined suitable FUOC/s did not result in an acceptable rate and power, returning to the necessary point in the process to attempt a co-existence with one or more other FUOCs deemed to be suitable.

With this particular arrangement, a method which allows different wireless networks and/or radios to co-exist in the same frequency band at the same time, causing interference with one another (i.e. they will interfere on purpose) is provided. This technique alleviates frequency spectrum congestion problems that plague conventional commercial wireless systems.

The method also enables different interfering networks/systems to co-operate within a band without requiring pre-specified coordination/cooperation protocols or means of direct communication with each other to negotiate a rate pair or other means for maintaining successful communication in the presence of each other's interference.

In the case where a SUOC cannot find an acceptable rate and power, the SUOC transitions to a so-called "threatened state" in which the SUOC determines parameters that will be used in finding another candidate FUOC or set of FUOCs. The SUOC then repeats the search process until a suitable FUOC or set of FUOCs is found.

In the case where successful communications are disrupted either between SUOC radios or as can be seen between FUOC radios (e.g. threatened or degraded by external events that were not present at the establishment of the communication state or when a targeted FUOC or set of FUOCs turns out or evolves to be inadequate), the SUOC again transitions to its threatened state in which the SUOC determines parameters that will be used in re-establishing a coexistence with a FUOC or set of FOUCs.

It should also be appreciated that a coexistence cognitive radio provided in accordance with the concepts, systems and techniques described herein could work without a MUD receiver. In this case, communications units within the coexistence cognitive radio would simply be provided the error correction coding scheme to use, or which MIMO scheme to use. A non-MUD technique may require a different way of ranking the FUOC's in terms of their suitability (since the ones most suitable for MUD are not necessarily the same ones most suitable for interference tolerance with coding or MIMO.

In accordance with still another aspect of the concepts, systems and techniques described herein, a co-existence cognitive radio that can operate within a spectrum that is already being used by other radios is provided. More specifically, the co-existence cognitive radio comprises: (a) a radio frequency (RF) characterization unit to characterize RF signals within a plurality of RF bands received at a receive antenna, the RF signals being associated with one or more first radios that are operative within the corresponding RF bands but are not communicating with the co-existence cognitive radio, the RF characterization unit having a control input to receive requests for signal characterization data corresponding to RF signals within different RF bands; (b) a rate determination unit to receive signal characterization data from the RF characterization unit and to use the signal characterization data to determine data rates that can be used by the co-existence cognitive radio to communicate with one or more second radios within RF bands already occupied by first radios, the rate determination unit having a control input to receive requests for rate and power information for use within different RF bands; (c) a decision making unit to select an RF band to co-occupy to communicate with the one or more second radios and to determine transmit parameters for use within the selected RF band based on data received from the RF characterization unit and the rate determination unit, the decision making unit being coupled to the control inputs of the RF characterization unit and the rate determination unit to send requests to the units for information about different RF bands; and (d) a configurable radio having an RF transmitter to generate an RF transmit signal for delivery to the one or more second radios that includes the selected RF band information and the corresponding transmit parameters to be used by the remote transceiver node to transmit signals to the co-existence cognitive radio.

In one embodiment, the rate determination unit is configured to generate scores for different occupied RF bands to gauge the desirability of using the RF bands to communicate with the one or more second radios, wherein the decision making unit is configured to use the scores to select the RF band and determine the transmit parameters.

In one embodiment, the configurable radio includes a multiuser detection (MUD) receiver to receive and demodulate signals-of-interest from the one or more second radios within the selected RF band, wherein the MUD receiver is capable of suppressing RF signals associated with one or more first radios within the selected RF band.

In one embodiment, the data rates determined by the rate determination unit are rates for use by the one or more second radios that will allow the MUD receiver to accurately demodulate the signals-of-interest from the one or more second radios within the selected RF band.

In one embodiment, the RF characterization unit is configured to provide a signal quality value and a modulation rate associated with an RF signal within an identified RF band in response to a request from the decision making unit for an updated estimate of a rate/MUD pair for the RF band.

In one embodiment, the RF characterization unit is also configured to estimate receive power levels associated with the one or more second radios before the decision making unit selects the RF band to use to communicate with the one or more second radios, wherein the decision making unit is configured to use the detected power levels to select the RF band.

In one embodiment, the decision making unit is configured to request updated rate information from the rate determination unit for a specific RF band if signal characterization data for the specific RF band changes before a band selection is made.

In one embodiment, the RF characterization unit is configured to provide at least one of the following for each of a plurality of occupied RF bands: received signal power, received signal modulation type, error correction coding type, code rate, received signal signature pulse, timing offset relative to reference, received phase offset relative to reference, baud rate, symbol duration, channel transfer function, and multipath characterization of channel.

In one embodiment, the decision making unit is configured to deliver maximum and minimum power levels to the control input of the rate determination unit, the maximum and minimum power levels representing power limits for use in communicating with the one or more second radios.

In accordance with a further aspect of the concepts, systems and techniques described herein, a method is provided for allowing a second user on channel (SUOC) radio to co-occupy a radio frequency (RF) band with a first user on channel (FUOC) radio in a network having multiple FUOC radios and multiple SUOC radios. More specifically, the method comprises: (a) identifying at least one other SUOC radio with which a first SUOC radio is to communicate; (b) scanning an RF environment for RF bands that are currently occupied by FUOC radios; (c) collecting signal parameters associated with the RF bands that are currently occupied by FUOC radios; (d) analyzing the signal parameters associated with the RF bands that are currently occupied by FUOC radios to identify rates that may be used by the first SUOC radio if it co-occupies the RF bands with the corresponding FUOC radio; and (e) selecting an RF band to co-occupy with a corresponding FUOC radio based, at least in part, on the identified rates.

In one embodiment, the FUOC radio currently occupying the selected RF band is the target FUOC radio; and the method further comprises: transmitting RF signals from the at least one other SUOC radio to the first SUOC radio within the selected RF band at a series of increasing power levels while observing operation of the target FUOC radio to identify any significant changes in behavior of the target FUOC radio; and selecting a SUOC transmit power level based, at least in part, on a power level that causes a significant change in behavior of the target FUOC radio.

In one embodiment, the method further comprises iterating rates and power levels used to transmit RF signals from the at least one other SUOC radio to the first SUOC radio within the selected RF band until a suitable rate and power level is found that permits acceptable co-occupation of the selected RF band with the target FUOC radio.

In one embodiment, the method further comprises: if a suitable rate and power level is found, establishing a communication connection between the first SUOC radio and the at least one other SUOC radio using the identified rate and power level.

In one embodiment, establishing a communication connection between the first SUOC radio and the at least one other SUOC radio includes activating a MUD receiver in the first SUOC radio to remove interference associated with the target FUOC radio from signals received from the at least one other SUOC radio.

In one embodiment, establishing a communication connection between the first SUOC radio and the at least one other SUOC radio includes using error correction coding in the first SUOC radio to remove errors in received data caused by interference associated with the target FUOC radio.

In one embodiment, establishing a communication connection between the first SUOC radio and the at least one other SUOC radio includes using multiple input, multiple output (MIMO) techniques to reduce the effect of interference associated with the target FUOC radio when processing RF signals received from the at least one other SUOC radio.

In one embodiment, the method further comprises if the communication connection between the first SUOC radio and the at least one other SUOC radio is later disrupted, entering a threatened state to identify a new target FUOC radio.

In one embodiment, the method further comprises if a suitable rate and power level is not found, entering a threatened state to identify a new target FUOC radio.

In one embodiment, identifying at least one other SUOC radio to which the first SUOC radio is to communicate includes maintaining a list of SUOC radios that are one hop neighbors of the first SUOC radio.

In one embodiment, identifying, scanning, collecting, analyzing, and selecting are performed at the first SUOC radio.

BRIEF DESCRIPTION OF THE DRAWINGS

The foregoing features of this invention, as well as the invention itself, may be more fully understood from the following description of the drawings in which:

FIG. 11 is a flow diagram for the procedure to construct an ordered list of powers to step through;

DETAILED DESCRIPTION OF THE PREFERRED EMBODIMENTS

Before describing a cognitive radio and related methods, some introductory concepts and terminology are explained. Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal, for example a digital bit stream, from one or several sources or sending nodes (or more simply sources or transmitters) to one or several destination or receiving nodes (or more simply destinations or receivers). Regardless of the particular manner or technique used to establish a channel, each channel has a certain capacity for transmitting information, often measured by its frequency bandwidth in Hz or its data rate in bits per second. The concepts, systems and techniques described find application in a wide variety of applications including, but not limited to: satellite communications (SATCOM), as well as with optical communications, wired communications (e.g. communications over a cable or other type of wire) and magnetic storage applications.

A coexistence cognitive radio and related techniques as described herein are capable of assessing a frequency spectrum, determining candidate bands in which other independent radios are already operating, and successfully sharing access of an already occupied frequency band with an independent radio system. The subject coexistence cognitive radios successfully transmit and receive in the pre-occupied band without detrimental harm to the pre-existing radio system that was already operating in that band. Moreover, the pre-existing radio system already operating in that band requires no additional capabilities to co-exist with the subject system. Specifically, the pre-existing radio system is not expected to communicate with the coexistence cognitive radio to accomplish the virtual negotiation to settle upon an agreeable co-existence of the two systems.

Figure 1:
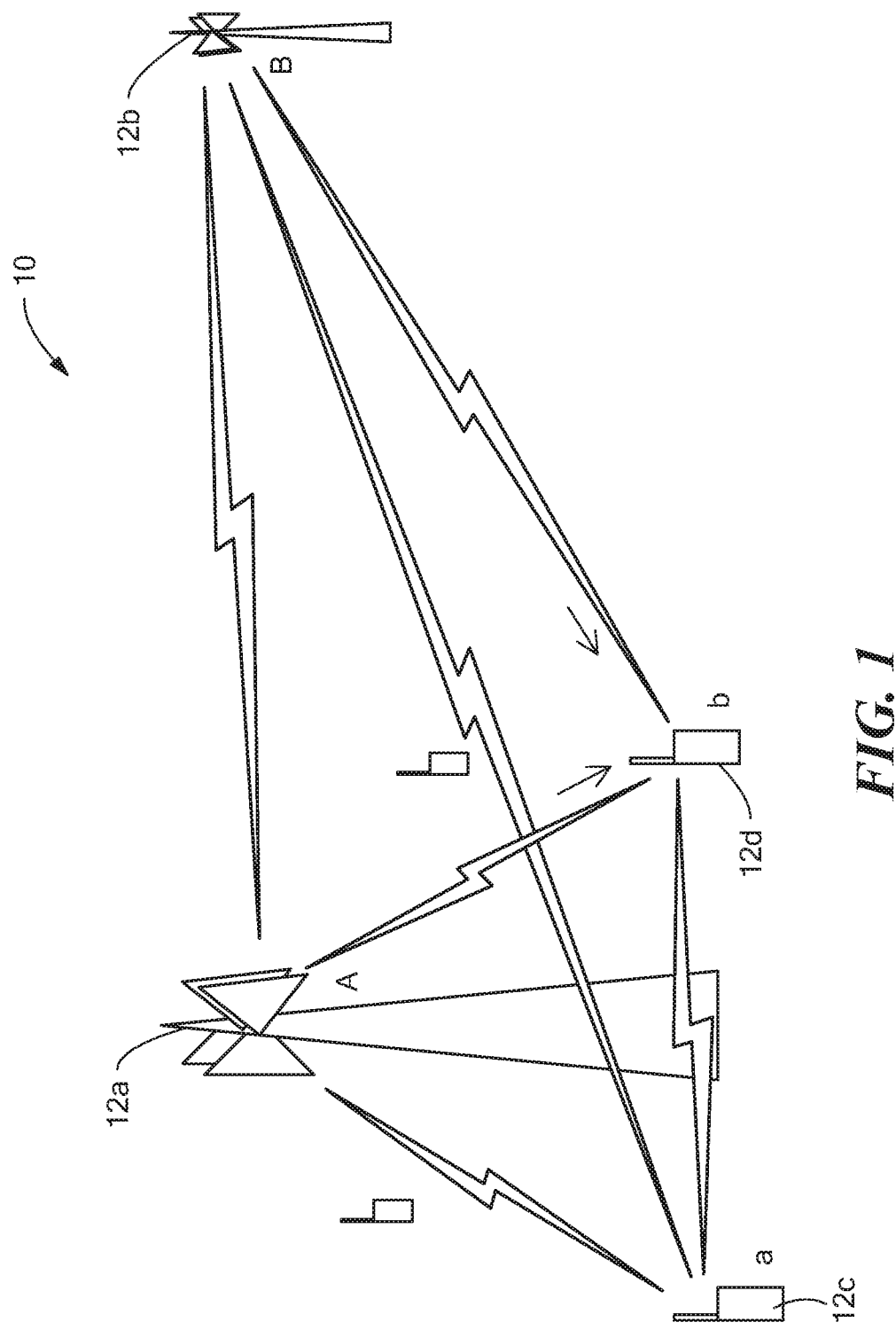
FIGS. 1 and 2 are diagrams illustrating various operational scenarios.
Figure 2:
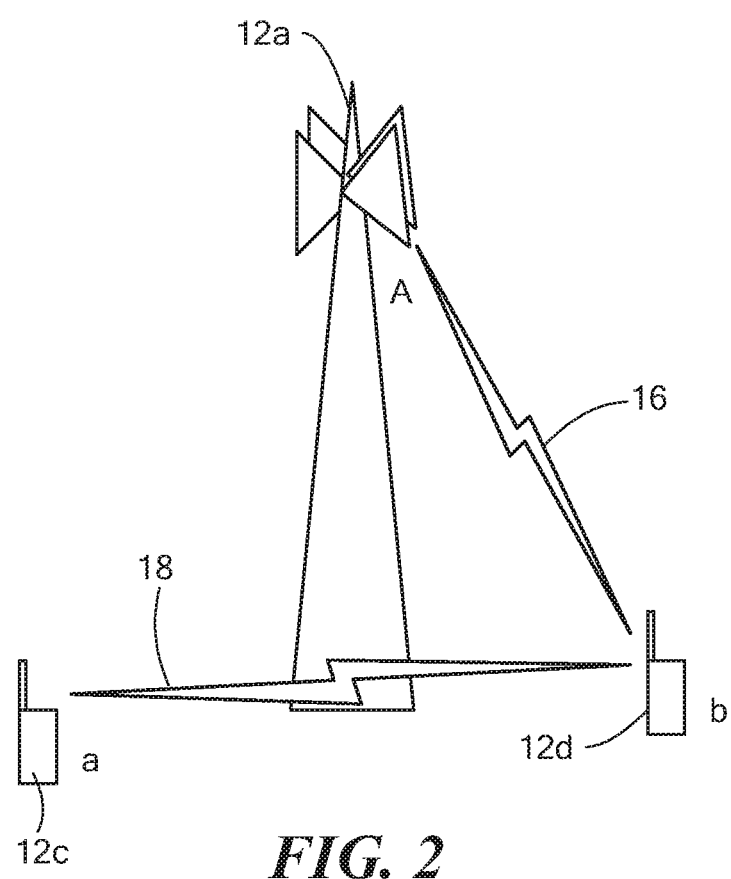

Referring now to FIGS. 1 and 2 in which like elements are provided having like reference designations, a network is shown to include a plurality of nodes, here four nodes designated as Node A (12a), Node B (12b), Node a (12c), and Node b (12d). Those of ordinary skill in the art will appreciate, of course, that the network may include any number of nodes with four nodes here being shown to promote clarity in the drawings and written description of the broad concepts described herein.

A First User On Channel (FUOC) begins to transmit from node A to node B in a free-and-clear channel. Thus, this channel is now "occupied."

A Second User On Channel (SUOC) operates with a coexistence cognitive radio (also sometimes referred to herein as a SUOC radio) and wants to communicate between Node a and Node b. By definition, a SUOC user intends to find and co-occupy the same band at the same time as a FUOC user. The concepts, systems, and techniques described herein focus on the SUOC user making use of the band occupied by links BA and AB.

The FUOC system (e.g., Node A) must possess the means to adapt to the radio frequency (RF) environment in which it is operating. Alternatively, the FUOC system can possess cognitive radio ability that includes sensing the environment, adapting to that environment, and even learning and/or predicting what to do to robustly operate within the environment at hand. Alternatively still, the FUOC system can include a coexistence cognitive radio as described herein that happened to choose a free and clear channel to occupy.

The SUOC radio (e.g., Node a) chooses an occupied channel over which to communicate (transmit/receive). The SUOC radio takes advantage of the adaptive nature of the FUOC that is already present in the occupied channel to enable modulation, power, and/or rate adaptation in the FUOC radio's transmitted signal to bring about an evolution that results in a coexistence of the FUOC and SUOC in the channel originally occupied only by the FUOC. A rate pair and transmit power pair that is acceptable to both the FUOC and SUOC radios is reached by active-intelligent actions emitted by the SUOC and reactive adaptations of the FUOC, with no direct communication between the two of them.

As will be described further below, the SUOC radio employs/performs: (1) spectrum sensing and parameter estimation means and methods to characterize potential FUOCs; (2) a rate pair prediction tool to guide it's choice of FUOC to target along with an appropriate rate pair (SUOC and FUOC achievable rates); (3) machine learning methods to automatically and on the fly take advantage of experience/ history; (4) a decision maker with multiple possible procedures that govern steps of interaction; and (5) a multiuser detection receiver to deal with the interference once information-bearing transmission has commenced by the SUOC radio.

Referring now to FIG. 2, occupied space is not useful if interference is simply treated as unstructured noise. However, a multi-user detection (MUD) receiver in the SUOC node (e.g., node b) enables successful wireless communication in the same band as the FUOC (e.g., Node A) because a MUD receiver can effectively remove interference caused by the FUOC and help the SUOC "see through" that interference in order to receive and detect (or "see") a signal of interest from one or more other SUOC transmitters. For example, as shown in FIG. 2, a MUD receiver in SUOC Node b can allow Node b to detect and demodulate signals 18 received from SUOC Node a despite interference 16 from FUOC node A. Thus, by including a MUD receiver in a node, occupied space can, to some extent, be equivalent to a free and clear channel.

The ability of occupied space to be equivalent to a free and clear channel depends, of course, upon a variety of factors including, but not limited to: (1) power and rate of interfering signals from a FUOC as received at the SUOC node; (2) a FUOC's "view" of his signals of interest (i.e. signals from the other FUOC radios); and (3) a FUOC's capability to appropriately adapt in the presence of interference. This means that radios with MUD receivers do not need to look only for "white space" (or unoccupied space), but can also use "black space" (or occupied space) in the spectrum.

Figure 3:
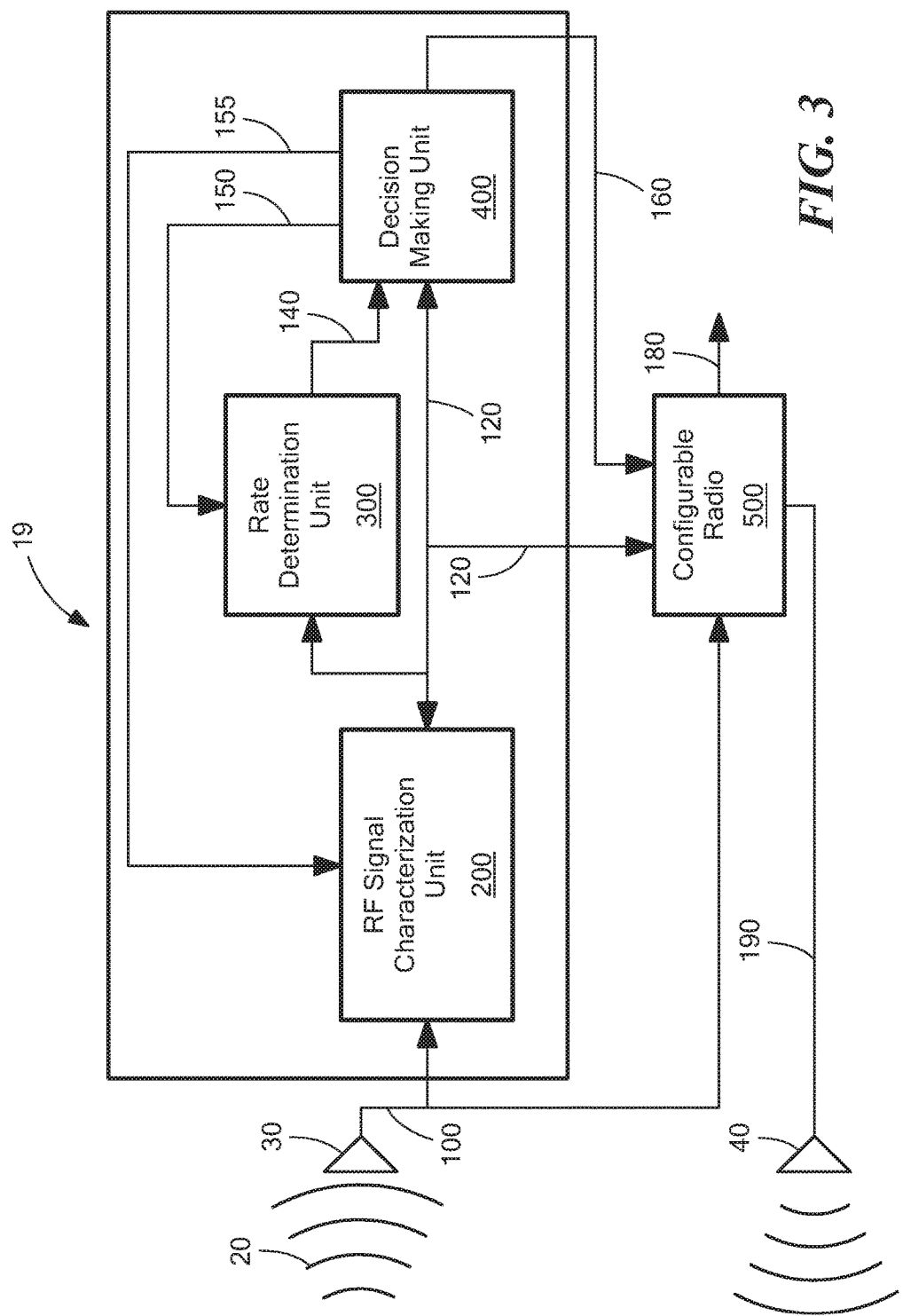
FIG. 3 is a block diagram of a transmit receive system which includes a rate determination unit.

Referring now to FIG. 3, a co-existence cognitive radio 19 that enables use of spectrum that is already being used by other radios includes a receive antenna 30 disposed to intercept electromagnetic waves or signals 20 propagating in the environment about the location of the receive antenna 30. Upon intercepting the electromagnetic signals 20, receive antenna 30 generates a received radio frequency (RF) signal and provides the received RF signal via a signal path 100 to an RF characterization unit 200.

RF signal characterization unit (RFSCU) 200 receives the signals provided thereto via antenna 30 and processes the received signals to provide output data including, but not limited to parameters of the received signals. Such signal parameters may include, for example, a carrier frequency and band that corresponds to a unique FUOC transmitted signal (also referred to as a target FUOC) and one or more of the following parameters associated with each target FUOC: received signal power, received signal modulation type (e.g. QPSK), error correction coding type, code rate, received signal signature pulse, timing offset relative to reference, received phase offset relative to reference, baud rate and/or symbol duration, channel transfer function and/ or multipath characterization of channel (all collectively referred to herein as "RFSCU signal parameters"). It at least one embodiment, both the RFSCU 200 and the configurable radio 500 may include a typical radio front end to down-convert and process received RF signals. In some embodiments, both the RFSCU 200 and the configurable radio 500 may each use the same front end circuitry. In some embodiments, a sliding filter may be provided as part of front end circuitry to observe the different RF bands one at a time in the RF characterization unit 200. In some other embodiments, a wideband front end may be used to capture signals within multiple (or all) of the RF bands at the same time.

RFSCU 200 is capable of sensing all or part of an RF spectrum that is potentially available for use by a SUOC radio. For each block of spectrum under examination of this unit, this unit measures and/or estimates each band of spectrum that is associated with a single RF system and or radio, as well as other signal parameters that are needed for operation of a coexistence cognitive radio or a system which includes or utilizes a coexistence cognitive radio or any related coexistence cognitive radio techniques. As described above, such signal parameters may include, but are not limited to: received signal power, received signal signature pulse shape (e.g. root raised cosine), received signal modulation type (e.g. QPSK), timing offset relative to reference, received phase offset relative to reference, baud rate and/or symbol duration, error correction coding type, code rate, channel transfer function and/or multipath characterization of channel.

It should also be appreciated that RFSCU 200 can also be used for pre-engagement of SUOC radios to acquire an estimate of the received power of the SUOC transmitters to which this receive SUOC radio will ultimately communicate. This pre-engagement SUOC characterization can alternatively be done in a configurable radio 500 described further herein below.

The RFCU signal parameters are coupled via a signal path 120 to a rate determination and FUOC grading unit (RD-FGU) 300, a decision making unit (DMU) 400 and a configurable radio 500 which includes a transmitter and multiuser detection (MUD) receiver.

For each target FUOC identified in the input on line 120, this RDFGU 300 is capable of determining the recommended rate for the SUOC that will allow for the MUD in the SUOC receiver to successfully pull out the SUOC signal of interest in the presence of the target FUOC's interfering signal and of computing a grade for each target FUOC that corresponds to the potential success the transmit-SUOC of interest will have in settling into coexistence with that target FUOC. Thus, in response to the signals provided thereto, RDFGU 300 determines SUOC recommended power and rate, and/or a grade, or set of powers and rates, and/or a set of grades and provide such information to DMU 400 via signal path 140. Thus, signal path 140 carries a list of recommended rates, or set of rates for the transmit-SUOC to coexist in the presence of each target FUOC presented on signal path 120, along with a grade corresponding to the anticipated probability of success of an attempt to coexist with that target FUOC. Alternatively, and in addition to or in place of the above, signal path 140 may carry a max rate, a min rate, and/or other rate possibilities for each target FUOC. Also, if the SUOC has more than one MUD it can use, then there would be a rate or set of rates for each MUD.

DMU 400 receives the signals provided thereto from RFSCU 200 and RDFGU 300 and in response thereto, DMU 400 provides one or more of control information and SUOC max and min power limits to RDFGU 300 via signal path 150. It should be appreciated that DMU 400 may request another grade and recommendation for rate if the target FUOC's power or rate changes across the time periods in which the parameters have been consecutively estimated (this can be accomplished in a reactive settling process, for example), along with any constraints DMU 400 puts on the SUOC's power. Also, along with this request, the new power and/or rate of the target FUOC is provided to the RDFGU 300. This may be accomplished, for example, by the RFSCU and a trigger message provided from either RDFGU 300 or DMU 400 to RFSCU 200 to tell the RFSCU 200 to collect and estimate the needed parameters in the target band.

As shown in FIG. 3, path 150 provides control information from DMU 400 to RDFGU 300. This control information is used by RDFGU 300 to trigger it to provide specific output along path 140 at times this new information is required by DMU 400 to perform the various DMU 400 functions that are described within this document. The control information passed from DMU 400 to RDFGU 300 along path 150 may contain, but is not limited to the following: request for transmit-SUOC achievable rate/s in presence of target FUOC, and values used in the determination of the SUOC's achievable rate/s such as transmit-SUOC's received SNR, MUD/s to be used in the receive SUOC for each achievable transmit-SUOC rate, target FUOC modulation, grade, and, if applicable, target FUOC's coding rate and received power.

DMU 400 provides control information to RFSCU 200 along path 155. The control information is used by RFSCU 200 to trigger it to provide specific output along path 120 at times this new parameter information is required by DMU 400 to perform the various DMU 400 functions that are described herein. The control information passed from DMU 400 to RFSCU 200 along path 155 may contain, but is not limited to, the following: 1) request for target FUOC carrier frequency and bandwidth, modulation and received SNR; 2) request for transmit-SUOC received SNR, channel transfer function, carrier frequency, phase offset, baud timing offset; and 3) request for complete or partial list of received signal parameters for all or portions of RF spectrum reserved for use by the SUOC radio network.

It should be appreciated that DMU 400 is capable of using the target FUOC list and corresponding parameter information provided on signal path 120 along with the recommended transmit SUOC rates for each target FUOC provided on signal path 140 to determine the best action for the transmit SUOC radio. This action is in the form of waveform choices, including, but not limited to rate of data transmission (bits per channel use or bits per Hertz) and transmit power.

DMU 400 also determines transmit-SUOC transmit waveform parameters (including but not limited to carrier frequency, bandwidth, power and rate) and provides such information to Configurable radio 500 along signal path 160. Thus, signal path 160 carries the output from DMU 400 (SUOC Transmit Waveform Parameters) that contains a single choice of target FUOC along with specific parameters that define the transmit-SUOC waveform to include rate, as well as the transmit power to be used by the transmit-SUOC.

Configurable radio 500 receives signals from RCU 200, DMU 400 and antenna 300 and in response thereto, configurable radio 500, provides to a transmit antenna 400 along a signal path 190 an RF signal to be transmitted. It should be appreciated that transmit antenna 400 may be the same as receive antenna 300 (i.e. as is known to those of ordinary skill in the art, receive antenna and transmit antenna may be the same physical structure).

At a second output, configurable radio 500 provides a digital stream of bits (a "bit stream") demodulated and decoded from a transmit-SUOC signal of interest along signal path 180. This is the decoded bits associated with the transmission from the transmit-SUOC radio of interest to this receive-SUOC radio.

It should be appreciated that configurable radio 500 includes a transmitter and multiuser detection (MUD) receiver. This radio 500 may be provided from technology known to one of ordinary skill in the art of wireless communication systems and MUD receivers. This radio 500 is capable of transmitting control signals to the transmit-SUOC as well as receiving and understanding control signals from the other SUOC radios to which it is the transmit-SUOC. It is also capable of transmitting buffered data via wireless transmission, according to a given waveform to include the medium access control scheme and other network layer protocols appropriate for successful wireless communication among radio nodes such as what is used in the cell phone handsets and base stations or in WiFi nodes and gateways.

The apparatus described above in conjunction with FIG. 3 is capable of sensing the available spectrum and determining good candidate FUOC user bands in which this SUOC system could successfully communicate given the MUD available on the SUOC radio.

This apparatus is capable of iterative transmission/probing, sensing, learning, and decision making, to bring about an acceptable communication rate for both the SUOC and the FUOC systems so that they both can utilize the same frequency band for communication.

As will be described in detail in conjunction with FIG. 4, the SUOC radios traverse three stages when they go from the state of having no spectrum in which to transmit to the state of successful transmission in a pre-occupied band.

Figure 4:
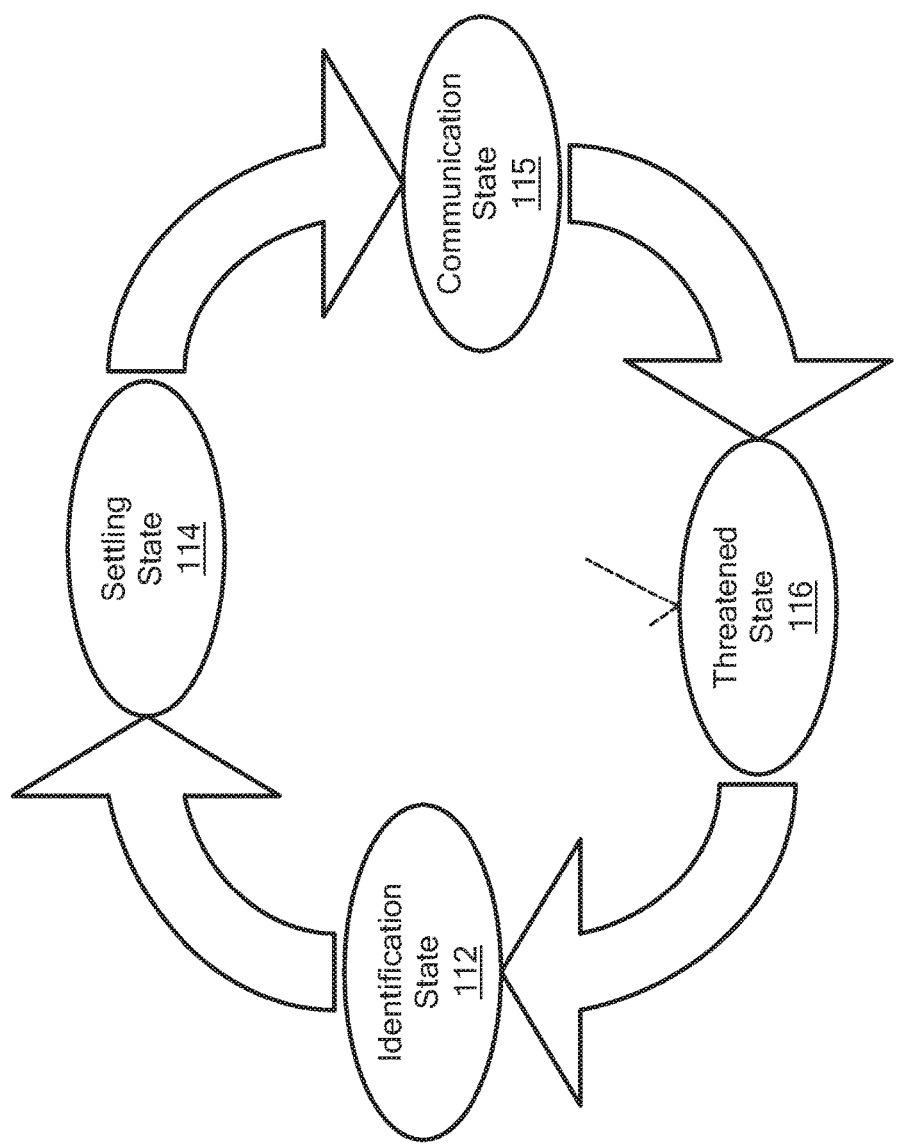
FIG. 4 is a state diagram of a SUOC radio illustrating the states the SUOC radio traverses to accomplish and maintain successful communications in coexistence with a FUOC.

Turning now to FIG. 4, the first state is the identification state. While the SUOC is in this state, it is scanning the RF spectrum and looking for suitable FUOCs with which to coexist. It should be appreciated that prior to entering the first state, the SUOC radios will need to discover each other or otherwise create and maintain a list of radios that are one-hop neighbors as well as acquire any other topographic and/or routing information required to maintain network communication. Establishing and maintaining the list of SUOC radio network members that require the co-existence link can be accomplished by any means appropriate, such as those used in dynamic spectrum access radios that seek unoccupied space for operation.

The second state is the settling state. While the SUOC pair is in this state, the transmit-SUOC is trying the hypothesized power and the receive SUOC is observing the target FUOC to look for any significant changes in its behavior, and, if needed, the process of computing achievable rates and transmitting at different power levels is iterated until a suitable transmit rate and power is reached that allows for acceptable coexistence with the target-FUOC previously identified in the identification state as being most suitable for coexistence. If no acceptable rate and power is possible, the SUOC pair transitions to the threatened state to determine parameters that will be used in finding another candidate target-FUOC. If the SUOC pair determined an acceptable rate and power, the SUOC pair transitions to the communication state.

The third state is the communication state. While in this state, the receive-SUOC is receiving signals from the transmit-SUOC with which it has successfully established a co-existence link. The MUD receiver may be employed in this state to mitigate the interference caused by the target-FUOC signal that interferes with the transmit-SUOC signal of interest. As described previously, in some implementations, error correction coding and/or multiple input, multiple output (MIMO) techniques may be used to deal with interference caused by FUOC's rather than a MUD receiver.

The fourth state is the threatened state. This state exists either when successful reception of a transmit-SUOC radio's signal is threatened or degraded by external events that were not present at the establishment of the communication state or when a targeted FUOC turns out to be inadequate. In other words, the successful communications, for some reason, has not occurred or has been disrupted. Disrupted communications is often due to change in location of the SUOC nodes which causes a degradation in the channel. It could also be caused by other factors in the RF or physical environment. Either way, the one or both of the SUOC pair radios identifies a diminished communication link and conveys it to the receive-SUOC DMU 400 along path 195, The DMU 400 logs some key parameters for use in the next round of target FUOC identification, then initiates a new identification state to look for a better band for closing the link with the transmit-SUOC radio.

It should be appreciated that a receive-SUOC can be in a communication state with one of its member SUOCs and in an ID state with another, and in a threatened state with another, etc. It should thus be understood that the intent of the state transition diagram of FIG. 4 is to explain the process between a single receive-SUOC and one of the transmit-SUOCs that is needed to close the link with this receive-SUOC.

As mentioned above, the apparatus described in conjunction with FIG. 3 is capable of supporting each of these four states and described below is a detailed description of each state as accomplished by the apparatus shown in FIG. 3 is provided.

The identification process described above in conjunction with FIG. 4 is next described in further detail. It should be appreciated that the identification process may be accomplished as follows by a coexistence cognitive radio apparatus which is the same as or similar to that described above in conjunction with FIG. 3.

The identification process may be summarized as follows: first, a spectrum map is created and potential target FUOC characterization is performed. Next, SUOC member radio signal and channel characterization is performed in potential target bands. Next, to determine estimated link throughput for each potential FUOC targeted for coexistence, it is necessary to make a decision as to which FUOC to target for coexistence and the identification process is complete and the SUOC radio exits the identification state, and enters the settling state.

Each of the steps in the identification process are next described in more detail in the context of the coexistence cognitive radio apparatus of FIG. 3. It should, of course, be appreciated that the described process may be performed by an apparatus other than the coexistence cognitive radio apparatus of FIG. 3 and references to particular structures performing particular functions are made only for the purpose of achieving clarity in the description of the broad concepts described herein. Such references are not intended as and should not be construed as limiting.

In one embodiment, to create a spectrum map and potential target-FUOC characterization, unit 200 scans the candidate frequency spectrum and characterizes each band as being unoccupied, or occupied. All occupied bands are further characterized by unit 200 by estimating parameters for each occupied band that will be used by other units within the SUOC apparatus. As discussed above, these parameters include: received signal power, received signal modulation type (e.g. QPSK), received signal signature pulse, timing offset relative to reference, received phase offset relative to reference, baud rate and/or symbol duration, channel transfer function and/or multipath characterization of channel. The technology required to provide the function of this unit is well known to those of ordinary skill in the art of radio frequency signal characterization systems. This annotated spectrum map (spectrum map with associated parameters) is output by unit 200 along signal path 120 to unit 300, unit 400, and unit 500 for later use.

To accomplish SUOC member radio signal and channel characterization in potential target bands, unit 200 within the SUOC receiver determines the received power and coarse level channel characterization (e.g. approximate duration of multipath-induced inter-symbol interference, course estimate of time coherence of channel) of the other SUOC radios in its neighbor network by engaging in an exchange of training tones or pulses or other appropriate signaling. Unit 200 computes each SUOC member radio signal parameters (such as received power) and channel parameters (such as multipath structure) and outputs them along signal path 120 to both unit 300 and unit 400 for later use. The technology required to provide the function of this unit is known to those of ordinary skill in the art of RF signal characterization systems and/or wireless communication systems.

To determine estimated link throughput and grade for each potential FUOC targeted for coexistence, for each occupied band (i.e. for each FUOC found and characterized by unit 200), unit 300 determines the transmit-SUOC rate for communication in the presence of the target-FUOC and outputs this information along line 140 to unit 400 for later use. In addition to the determined transmit-SUOC rate, a grade associated with this rate and target FUOC is computed by unit 300 and is output along line 140 to unit 400 for later use.

To decide which FUOC to target for coexistence, unit 400 makes a decision using a decision method and procedure that makes use of the parameter information input along line 120 and the rate choice and grade input along line 140, and any previously collected historical information saved from prior interactions at other times with similarly characterized FUOCs. If no historical information has been collected, or if the DMU 400 has chosen to ignore historical data on long-past settling attempts, the FUOC with the highest grade as determined by the RDFGU 300 will be chosen as the target FUOC with which to settle. If settling with this highest-grade FUOC has just failed, then the next highest-grade FUOC will be chosen, and so on, until a FUOC is successfully settled into coexistence with the transmit-SUOC.

If historical data has been collected and is chosen to be used by unit 400 in the decision making process, a new set of grades may be computed based on the historical data, the composite grade list. The composite grade for each target-FUOC in association with the current transmit-SUOC of interest may be a function of the grade provided by the RDFGU 300 and a factor derived from the historical database features attributed to this same target-FUOC with similar circumstances for transmit-SUOC. One example of a composite grade computation is to multiply the RDFGU grade by a factor that ranges from to 1, determined to represent the probability of successful settling from past attempts to settle with the target-FUOC or similar target-FUOC under conditions similar to those existing with the current transmit-SUOC. The target FUOC chosen to engage in the settling process is the target FUOC with the highest composite grade. Unit 400 outputs the necessary transmit SUOC waveform parameters (such as carrier frequency and bandwidth) that match its decision for target FUOC and coexistence rate and power. When the identification process is complete, the SUOC radio exits the identification state and enters the settling state. The settling process is described next.

FIGS. 5, 9, 10 and 11 are flow diagrams showing the processing performed by a processing apparatus which may, for example, be provided as part of a network which includes SUOC radios which may be the same as or similar to those described in any of FIGS. 1-4, 7 and 8. The rectangular elements (e.g. block 508 in FIG. 5 in the flow diagrams are herein denoted "processing blocks" and represent steps or instructions or groups of instructions. Some of the processing blocks can represent an empirical procedure or a database while others can represent computer software instructions or groups of instructions. The diamond shaped elements in the flow diagrams (e.g. block 502 in FIG. 5) are herein denoted "decision blocks" and represent steps or instructions or groups of instructions which affect the processing of the processing blocks. Thus, some of the processes described in the flow diagram may be implemented via computer software while others may be implemented in a different manner e.g. via an empirical procedure.

Alternatively, some of the processing and decision blocks can represent processes performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to perform the processes or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of processes described is illustrative only and can be varied without departing from the spirit of the concepts, systems and techniques disclosed herein.

Figure 5:
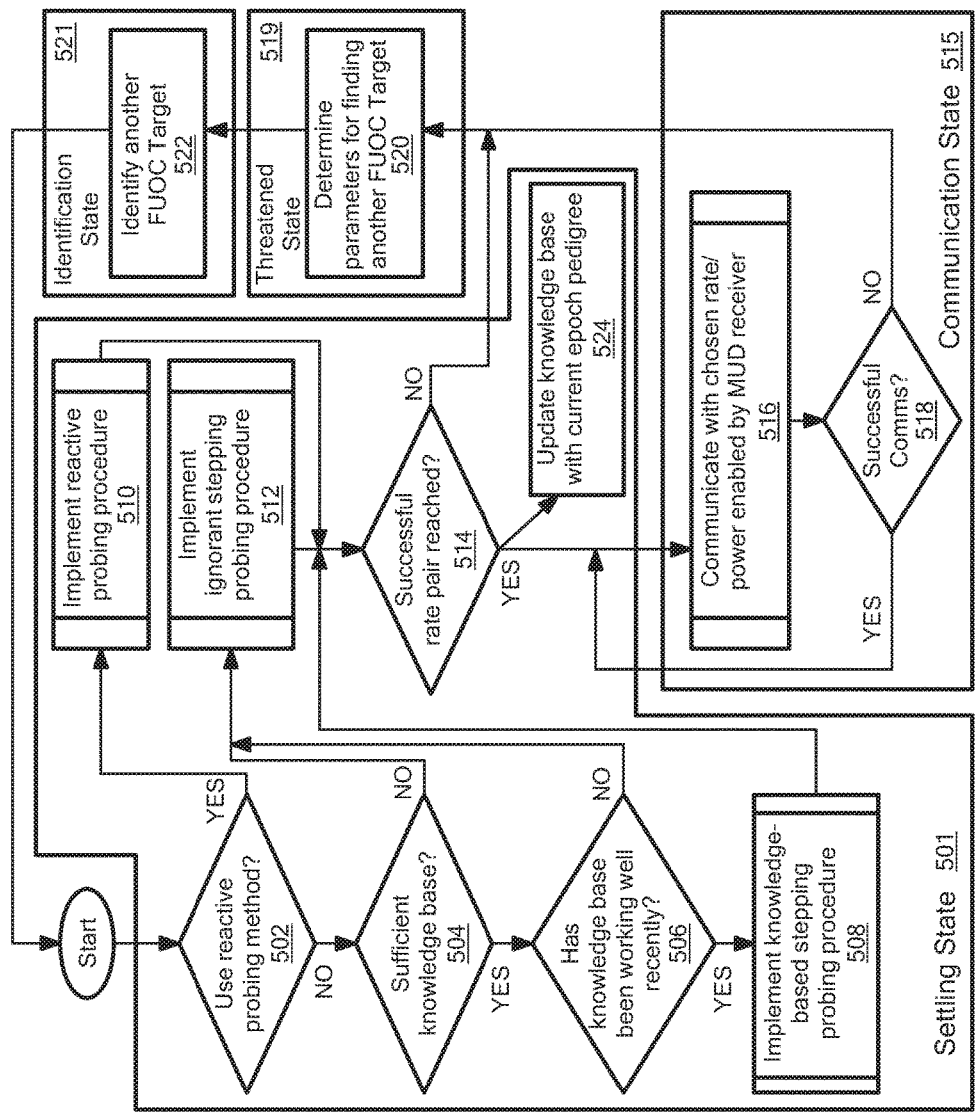
FIG. 5 is a flow diagram illustrating the procedure for controlling a SUOC radio.

FIG. 5 is a high level flow procedure used by a SUOC to control its actions as well as to control the transitions it makes from one state to another after successfully completing the identification process is shown. FIG. 5 shows the cycle the SUOC traverses while in the settling state. The process is accomplished by cycling through four actions as listed below and also shown in FIG. 6.

Turning now to FIG. 5, upon entering the settling state 501, as shown in decision block 502, the SUOC cognitive engine (CE) determines if a reactive probing procedure is to be used. This could, for example, be a user-set parameter or could be set by a cognitive engine for any number of reasons/triggers experienced during operation. If a reactive probing procedure is to be used, then the SUOC CE guides implementation of the reactive probing procedure as shown in processing block 510.

After the reactive probing procedure 510, processing flows to decision block 514 in which a decision is made as to whether a successful rate pair was reached. If a successful rate pair was reached, then the SUOC enters its communication state 515 and processing proceeds to processing block 516 in which the SUOC communicates with the chosen rate/power enabled by the MUD receiver. Processing then flows to decision block 518 where a determination is made as to whether there is successful communications.

If in decision block 518 a determination is made that there is successful communications, then the SUOC remains in its communication state and processing loops back to processing block 516 and this loop is repeated as long as successful communications exist.

If in decision block 518 a determination is made that there is not successful communications, then the SUOC enter its threatened state 519 and processing proceeds to processing block 520 where parameters are determined for finding another SUOC target. The SUOC then enters its identification state 521 and processing proceeds from processing block 520 to processing block 522 where the SUOC identifies another FUOC target.

If in decision block 520, a decision is made that the reactive probing technique will not be used, then processing proceeds to decision block 504 where a decision is made as to whether a sufficient knowledge base exists. If in decision block 504 a decision is made that a sufficient knowledge base does not exist, then processing proceeds to processing block 512 in which a so-called "ignorant stepping procedure" is implemented. Upon completion of the ignorant stepping procedure, processing flows to decision block 514 and processing proceeds through blocks 514-522 as described above.

If in decision block 504, a decision is made that a sufficient knowledge base does exist, then processing proceeds to decision block 506 in which another decision is made as to whether the knowledge base has been working well recently. If in decision block 506 a decision is made that the knowledge base has not been working well recently, then processing proceeds to processing block 512 in which the ignorant stepping procedure is implemented and upon completion of the ignorant stepping procedure, processing flows to decision block 514 and processing proceeds through blocks 514-522 as described above.

If in decision block 506 a decision is made that the knowledge base has been working well recently, then processing proceeds to processing block 508 in which a knowledge-based stepping probing procedure is implemented and upon completion of the knowledge-based stepping probing procedure, processing flows to decision block 514 and processing proceeds through blocks 514-522 as described above.

Figure 6:
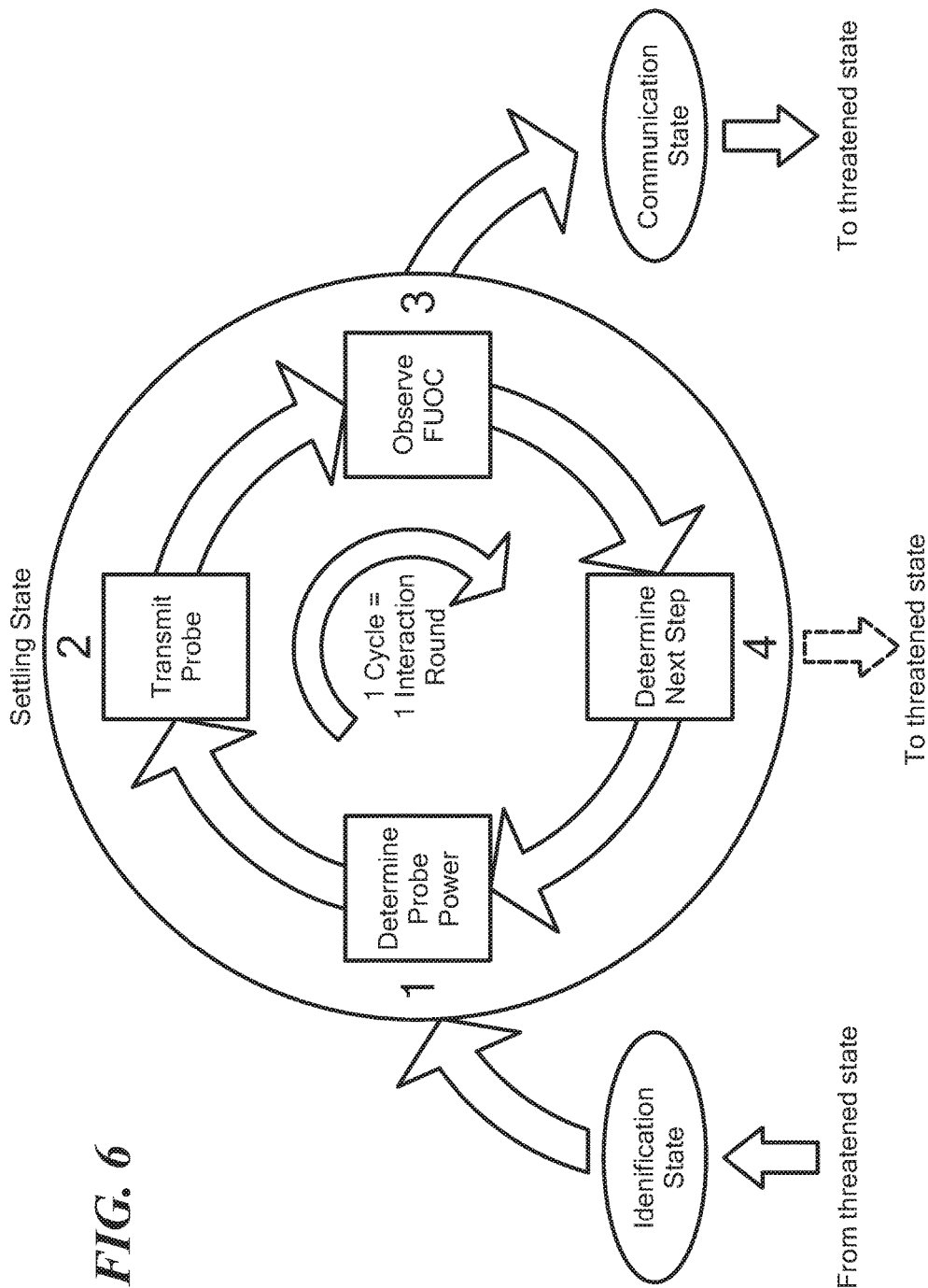
FIG. 6 is a state diagram illustrating SUOC radios settling process through interaction with FUOC.

Referring now to FIG. 6, a SUOC radios' settling process through interaction with FUOC includes: (1) determining the candidate power; (2) probing the FUOC via a transmission from the SUOC transmitter radio; (3) observing the FUOC's signal to determine if any change has occurred; (4) return to step 1 to determine a new candidate power that may cause less damage to the FUOC, or, if no or little damage has been caused, exit this settling state and move into the communication state.

The apparatus shown in FIG. 3 is capable of interacting with the FUOC radio without direct communication with the FUOC radio. The goal of these interactions is for the receive-SUOC radio (the SUOC radio that it is "listening" and receiving data on the occupied channel once communication commences) to determine if the rate and power that it has estimated to work for the transmit-SUOC radio (the SUOC radio that it is transmitting data on the occupied channel once communication commences) will allow the FUOC to remain effective as a communicator within its own FUOC network once the SUOC transmitter/s commence/s transmission. This interaction is referred to as the settling stage, in which a settling process is carried out.

This settling process is possible because the adaptive feature of the FUOC radio. Specifically, the FUOC radio has a built in feature that causes it to adjust its power and rate, and, in some cases, the direction of transmission, to overcome any less-than-ideal channel, noise and/or interference conditions in the RF environment. The SUOC radio, the subject of this invention, takes advantage of this FUOC quality to bring about co-existence so that both the SUOC and FUOC can successfully make use of the same RF band and the same time with a sort of "soft" collision that either does no harm at all to the FUOC's ability to communicate, or causes the FUOC to only dial down its rate and or dial up its power slightly to accommodate the SUOC's interference signal.

If during the settling process, the SUOC determines that the FUOC's rate and or power have been compromised, the SUOC further determines if the compromise is within an acceptable range, thus allowing the SUOC network to maintain acceptable communications in the same band that was originally occupied only by the FUOC radios by causing a reasonable reduction in FUOC communication efficiency (e.g. a slightly lower rate or higher power). If the SUOC determines that its original identification of this FUOC as being a candidate for coexistence was wrong, the SUOC is capable of starting the identification process again to find a different FUOC target that is estimated to favorably accommodate co-existence. These interactions are described by FIG. 5 and are referred to as the settling process.

Next, one exemplary implementation of a settling process is described. The settling process takes place within the cognitive engine portion of the apparatus shown in FIG. 3 as repeated in FIG. 7.

Figure 7:
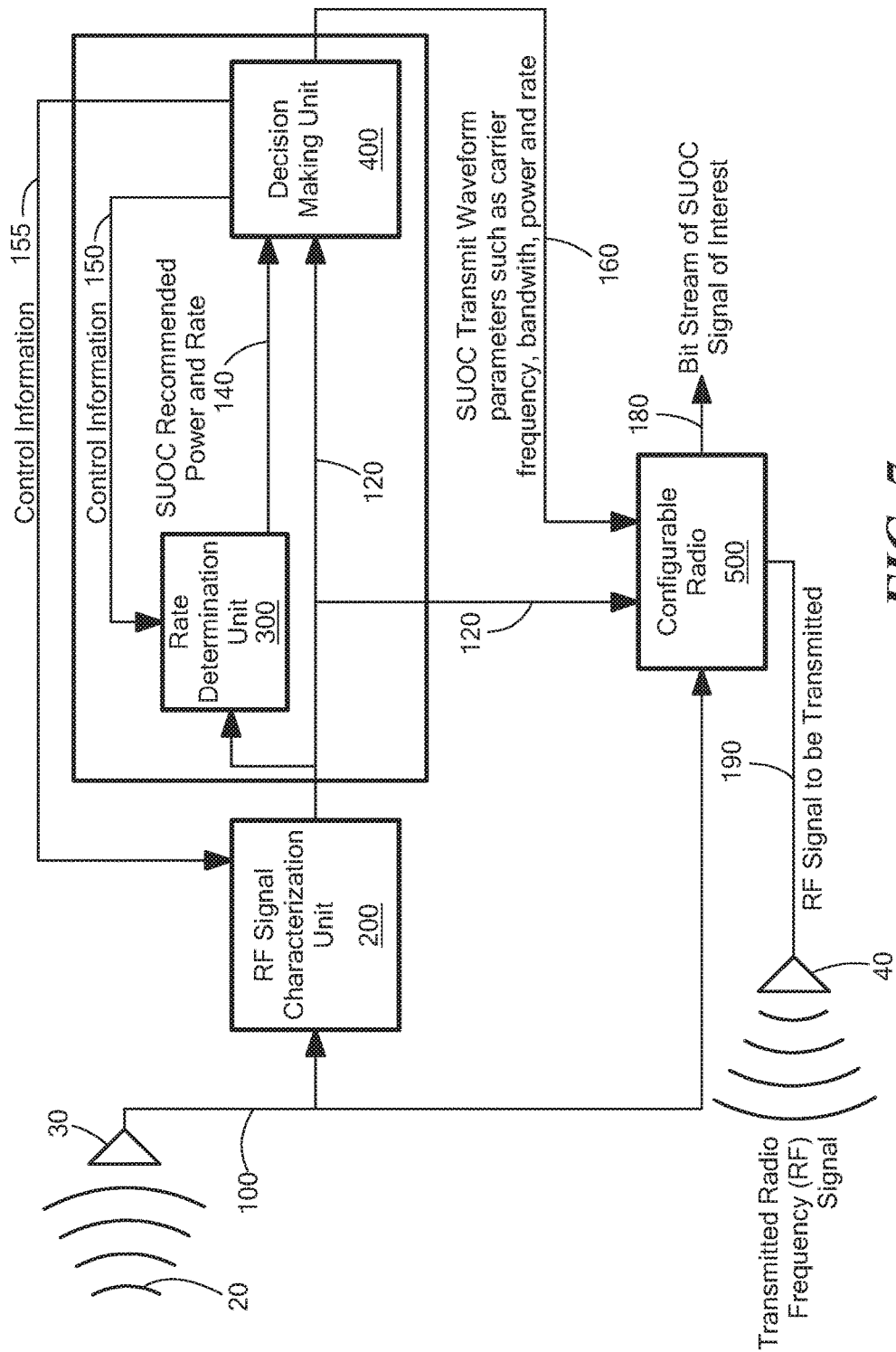
FIG. 7 is a block diagram of a transmit and receive system which includes a SUOC cognitive engine responsible for a settling process control.

Referring now to FIG. 7 units 300 and 400 comprise the SUOC cognitive engine. After the identification process has completed, the settling process is accomplished as next described.

Within unit 400, retrieve the maximum and minimum transmit SUOC rate and corresponding powers that were computed by unit 300 and input along line 120 at the end of the identification process.

Unit 400 makes a decision as to the type of probing process to use during the settling stage. Unit 400's decision as to which probing process to use can be determined either by default setting, user input (i.e. a knob set by the user), or an internal process to the SUOC. One example internal process would provide a flag for reactive probing that is first alternated between 1 and 0 to allow the radio to try out the different types of probing procedures for different situations as characterized by the parameter information input along line 120, the grade, and the rate choice input along line 140, Then, after some large number of settling attempts, the DMU determines which procedure has been working better for each class of situation and sets the reactive probing flag to 1 if reactive probing has been working better than following the process started by not using reactive probing in the situation that best matches the one at hand.

Specifically, a probing determination method is determined within unit 400. This probing determination method is then initiated within unit 400 and the first result of which is the determination of the specific power to try for attempting communications in this targeted FUOC band at the desired rate.

Unit 400 outputs control information along line 160 to unit 500 in the receive-SUOC radio transmitter. This control information contains instructions needed by the transmit-SUOC for the probe signal that it will need to transmit.

The technology for implementing the acquisition process required to provide the function of unit 500 is known to those versed in the art of wireless communication systems.

This control signal is transmitted wirelessly by the receive-SUOC and is received by unit 500 of the transmit-SUOC. This control signal tells the transmit-SUOC what it needs to transmit back to the receive-SUOC. The technology required to provide the function of this unit is known to those of ordinary skill in the art of wireless communication systems.

Unit 500 within the transmit-SUOC transmits the probing signal as instructed by the control signal it has received from the receive-SUOC. The technology required to provide the function of this unit is known to those versed in the art of wireless communication systems. During the probing/settling process, this probing signal is a signal that is perceived equivalently by the target-FUOC as an actual interfering communication signal would be perceived. Any signal appropriate for this purpose will suffice, to include a tone, a band of noise signal, a "dummy" communication signal that is a non-information bearing version of the anticipated communication signal (e.g. QPSK modulated by a training sequence or random bit stream.) The appropriateness of each type of probing signal will depend, in part, upon the FUOC waveform and receiver. If the SUOC radio possesses knowledge of the FUOC waveform and receiver (for example, the FUOC has been built to conform to the well known LTE standard) then the SUOC radio (within unit 400) could use this knowledge to guide the choice of the probing signal decision.

If the receive-SUOC is currently in the settling stage, unit 200 within the receive-SUOC characterizes the target-FUOC signal in the presence of the transmit-SUOC's probing signal. Unit 200 passes characterizing information along line 120 to units 300, 400 and 500.

Unit 400 records and/or updates a data base that keeps track of characterizations of the target FUOC in the current settling process as well as characterizations of the target FUOC at the conclusion of the settling process. This information is used in future interactions with similarly characterized FUOC signals.

Unit 400 determines the next portion of the settling process from among the following options:
1. Request another rate/power option from unit 300 to guide next decision for probing signal, and determine the next probing signal parameters, then proceed with 3 below.
2. Use the next step in the power stepping list to determine the next probing signal parameters, then proceed with 3 below.
3. Stop probing current target FUOC band and exit settling process with direction to enter communication state.
4. Stop probing current target FUOC band and exit settling process with direction to enter threatened state.

Figure 8:
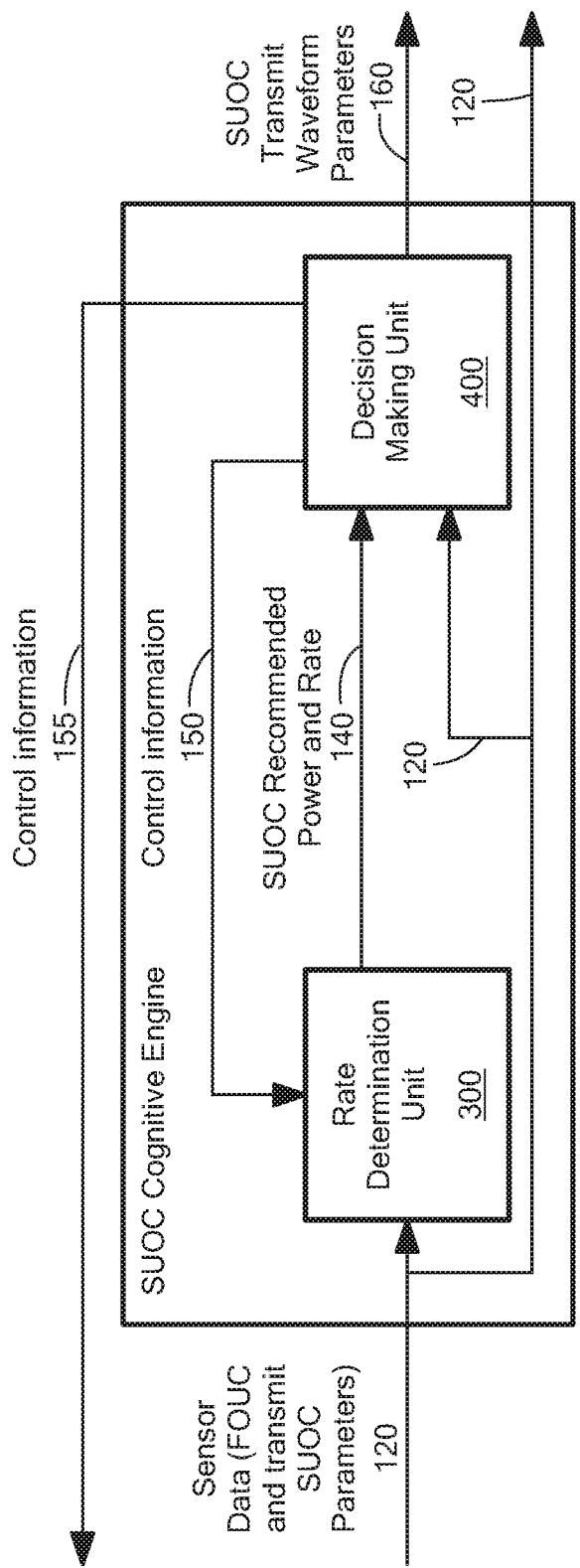
FIG. 8 is a block diagram of a SUOC cognitive engine.

Referring now to FIG. 8, the job of the SUOC Cognitive Engine (CE) is, among other things, to autonomously guide SUOC state transitions, guide processing and actions within each state transition, and to perform some processing and actions that are needed to make decisions and provide guidance. The CE provides a critical function during the settling process. To accomplish this function, RF characterization unit 200 is enlisted to collect information and estimate parameters whenever DMU 400 needs new information for a new decision.

One goal of the receive-SUOC Cognitive Engine (CE) is to achieve acceptable coexistence transmission by transmit-SUOC or to determine if target-FUOC should be abandoned.

The cognitive engine orchestrates the process that results in the determination of a power level and communication rate the SUOC transmitter will employ when the SUOC transitions to the communication state.

Figure 9:
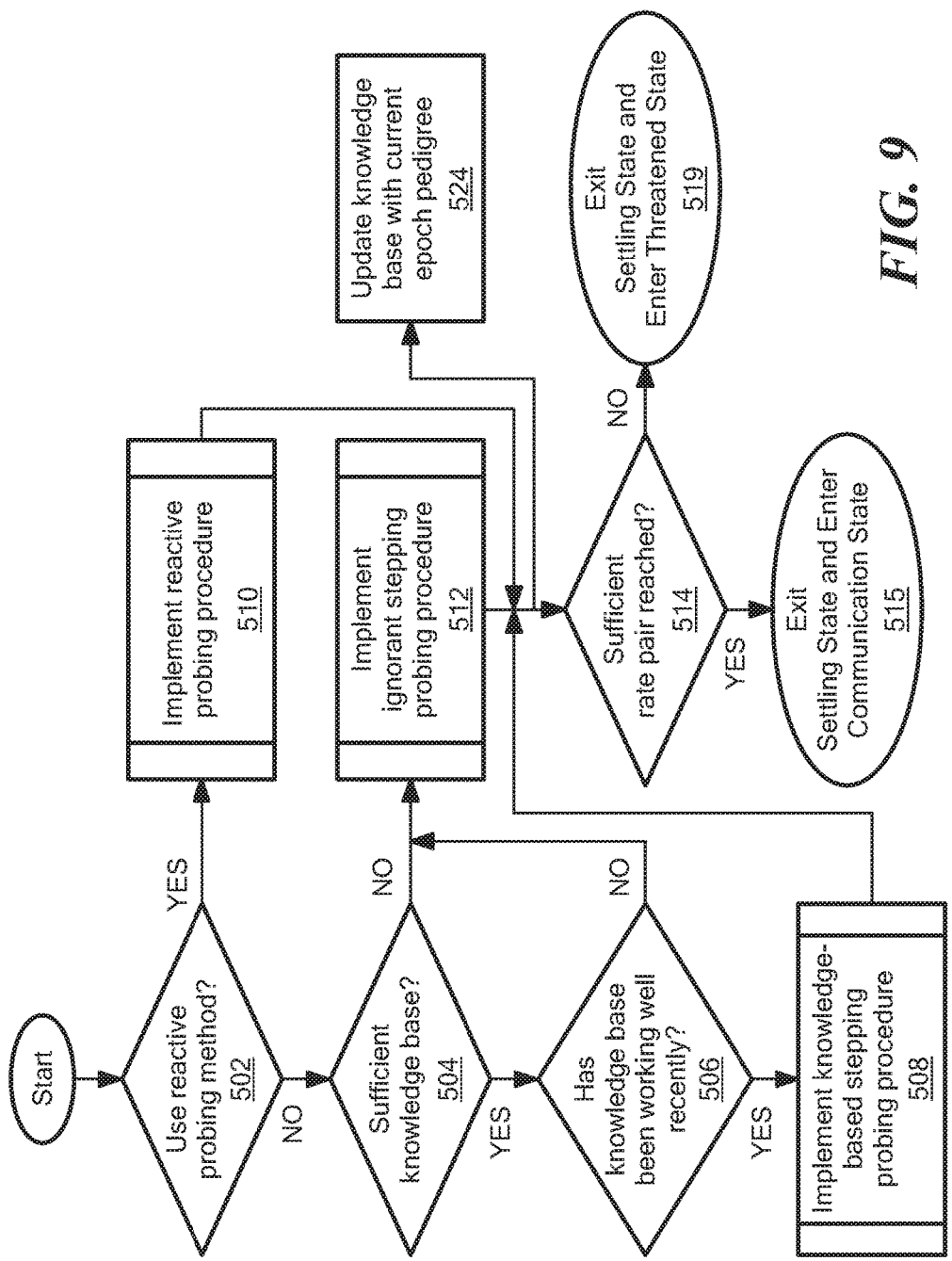
FIG. 9 is a flow diagram illustrating the procedure for controlling a settling process.

Referring now to FIG. 9, in which like elements of FIG. 5 are provided having like reference designations, a flow diagram of a procedure for controlling the settling process is shown.

As shown in decision block 502, upon entering the settling state (e.g. settling state 114 in FIG. 4), the SUOC CE determines if the reactive probing procedure is to be used. This could, for example, be a user-set parameter or could be set by the CE for any number of reasons/triggers experienced during operation.

If reactive probing procedure is to be used then the SUOC CE guides implementation of the reactive probing procedure. In one embodiment, the reactive probing procedure may be accomplished as described above in conjunction with FIG. 5

In one embodiment, determining the first probing power to try can be accomplished from the following: (A1) Max Power: the transmit-SUOC transmit power that would correspond to a received $SNR_{a,initial}$ at the receive-SUOC to achieve the desired max rate for the receive-SUOC in the presence of this FUOC when using the MUD receiver that is implemented in the receive-SUOC. This $SNR_{a,initial}$ can be solved for by using the rate boundary equations described in co-pending application number PCT/US2013/031900, filed Mar. 15, 2013 and incorporated herein by reference in its entirety; (A2) Min Power: the transmit-SUOC transmit power that would correspond to a received $SNR_{a,min}$ at the receive-SUOC to achieve the minimum desired rate, $R_{a,min}$, in the presence of this FUOC when using the MUD receiver that is implemented in the receive-SUOC: (A3) Med Power: Another option is to choose an intermediate power between the Max Power and Min Power defined in (A1) and (A2); (A4) Learned Initial Power: Over time, the DMU 400 logs historical results and can therefore search the data history to determine which initial power scheme resulted in the smoothest settling process out of (A1)-(A3) approaches.

If the settling procedure (i.e. 501 in FIG. 5) results in a successful rate for the SUOC as well as for the target FUOC, then the knowledge data base is updated with information about this FUOC and its initial identifying parameters and the final successful waveform parameters for both the SUOC and FUOC. Then the CE guides the SUOC to exit the settling state 501 and enter the communication state 515.

If, instead, the settling process 501 did not result in a successful rate for both SUOC and FUOC, the knowledge data base is also updated with information about this FUOC and the unsuccessful attempt at achieving co-existence as shown in processing block 524. In addition, the CE guides the SUOC to exit the settling state and enter the threatened state 519 in order to ultimately identify a new target-FUOC for attempt at settling into a successful co-existence (as shown at processing block 520 in FIG. 5).

If reactive probing is not to be used, the SUOC CE determines first if the knowledge base (the data base collected from past interactions with different FUOCs) is or is not sufficient for use during the current settling process 504. An example of sufficiency is if the knowledge base contains a sufficient number of instances of having encountered a FUOC with the same parameters that characterize the current target-FUOC.

If the knowledge base is not sufficient, then the SUOC CE guides implementation of a settling procedure that does not require use of historical information. The SUOC implements an ignorant stepping trial and error procedure 512 that is described in FIGS. 10, 10A, and 12.

If the settling procedure results in a successful co-existence, then the process includes updating the knowledge data base 524 with information about this FUOC and its initial identifying parameters and the final successful waveform parameters for both FUOC and SUOC. Then the CE guides the SUOC to exit the settling state and enter the communication state 515.

If, instead, the settling process did not result in a successful co-existence, then the process returns to 524 in which the knowledge data base is also updated with information about this FUOC and its initial identifying parameters and the unsuccessful attempt at achieving co-existence. In addition, the CE guides he SUOC to exit the settling state 501 and enter the threatened state 519 in order to ultimately identify a new target-FUOC for attempt at settling into a successful co-existence (as shown in 520 in FIG. 5).

If, at 504 above, the CE determines the knowledge data base to be sufficient, then the CE next determines if the knowledge base has been working well in recent attempts with similar FUOC targets similar to the current target 506. If it has not been working well, then the CE guides the SUOC to perform ignorant stepping procedure 512, and then proceeds as in 514. For example, if the knowledge base has many instances of FUOCs that resemble the current target, and if settling has been tried recently using these instances and has not been efficient or effective, then the knowledge data base is deemed "stale" and not worth using, so the next step is to implement ignorant stepping procedure that does not use the knowledge data base 512.

If, instead of the situation in which the knowledge base is not working well, the CE determines that the knowledge base is working well (e.g. a decision is made in decision block 506 that the knowledge base is working well), the CE guides the SUOC to implement the knowledge-based stepping procedure described in FIGS. 10, 10A, 11, 13, and 14.

If the settling procedure results in a successful co-existence, then the SUOC exits its settling state and enters its communications state 515

If, instead, the settling process did not result in a successful co-existence, then the SUOC exits its settling state and enters its threatened state 519.

In some exemplary embodiments, an exemplary reactive probing procedure (e.g., procedure 510 in FIGS. 5 and 9) is used as described below in steps (A)-(J). The following notation is used in steps (A)-(J): $SNR_a$=received SNR due to the most recent probing signal transmitted by the transmit-SUOC; $SNR_A$=received SNR due to the signal transmitted by the target-FUOC; $R_a$=achievable rate computed by the RDFGU 300 for current situation of SUOC and target FUOC; $R_A$=actual rate of signal transmitted by target-FUOC; $R_{a,min}$=minimum acceptable rate for the link between transmit-SUOC and receive-SUOC that is attempting to be established; $R_{a,max}$=maximum desired rate for the link between transmit-SUOC and receive-SUOC that is attempting to be established; $SNR_{a,max}$=maximum allowable received SNR due to signal transmitted by transmit-SUOC. It will be appreciated that $SNR_{a,max}$ could be equivalently replaced with a max transmit power or a received SNR that is associated with a max transmit power constraint on the transmit-SUOC device.

The reactive probing procedure of steps (A)-(J) will now be described. (A) Set the zeroth probing power to zero (indicating no communication between transmit and receive SUOC is possible) and set the fallback flag to zero (meaning no dialing down of SUOC power has occurred yet). (B) Next determine a first probing power to try. (C) If transmit-SUOC power is zero, go to (I). Otherwise, transmit-SUOC sends a probe signal that interferes with the FUOC's signal using the transmit-SUOC signal transmission power determined in previous step executed. (D) Receive-SUOC observes the FUOC's signal. If the "fallback" flag has been set to one, go to (H). (E) If any negative changes occurred in the FOUC's signal modulation or power (modulation or rate decrease or power increase), log it; if not go to (G). (F) If the max number of allowable FUOC changes has been exceeded, set the transmit-SUOC settled power to the second to last power tried (before this last negative change occurred in the FUOC signal parameters), set the "fallback" flag to one, and go to (C). If the max number of allowable FUOC changes has not been exceeded, processing proceeds to (G). (G) Submit request for new (rate, MUD) pair determination to unit 300 based upon the last SNRa, SNRA, and FUOC rate. Use the output on line 140 (FIG. 3) to determine if desired pair ($R_{a,max}$, $MUD_{SUOC}$) is achievable with this SNRa, SNRA, and FUOC rate. If the desired pair ($R_{a,max}$, $MUD_{SUOC}$) is achievable, go to (I). If the desired pair ($R_{a,max}$, $MUD_{SUOC}$) is not achievable, increase the transmit-SUOC transmit power by some appropriate increment not to exceed the corresponding received $SNR_{a,max}$ and go to (C). (H) Submit a request for a new (rate, MUD) pair determination to unit 300 based upon the corresponding SNRa (corresponding to the "fallback" power since step H is executed only after the transmit-SUOC has dialed down its transmit power to the second to last highest power tried so far) and the just measured SNRA, and FUOC rate. Use this most recent output passed to unit 400 from unit 300 on line 140 to determine if a pair (Ra, $MUD_{SUOC}$), with Ra>=$R_{a,min}$ is achievable with the fallback transmit-SUOC SNRa and current FUOC signal SNRA and RA. If a pair (Ra, $MUD_{SUOC}$), with Ra>=$R_{a,min}$ is achievable with the fallback transmit-SUOC SNRa and current FUOC signal SNRA and RA, go to (J). If a pair (Ra, $MUD_{SUOC}$), with Ra >=$R_{a,min}$ is not achievable with the fallback transmit-SUOC SNRa and current FUOC signal SNRA and RA, go to (I). (I) Log current situation details in knowledge base and enter threatened state. (J) Log current situation details in knowledge base and enter communication state.

It should be noted from the above description that three probing determination techniques have been developed: (1) Ignorant Stepping Probing (List based); (2) Knowledge-based Probing (List based); and (3) Reactive Probing.

Each of these techniques provides a different method for determining the next probing signal to use and whether or not the probing process should continue or stop. The implementation of all three techniques within a coexistence cognitive radio as described herein can provide a method appropriate for the various conditions expected to exist at any given time for SUOC radios.

The first two methods, ignorant stepping probing and knowledge-based probing, both rely upon the construction of a list of powers for successive use by decision making unit 400 (FIG. 7) to simply "look up" the next power value to try with the next probing signal that is transmitted. The third method, reactive probing, requires decision making unit 400 to request a new determination of rate and power from unit 300 (FIG. 7) for each new probing signal trial.

All three methods are described in detail below.

Figure 10:
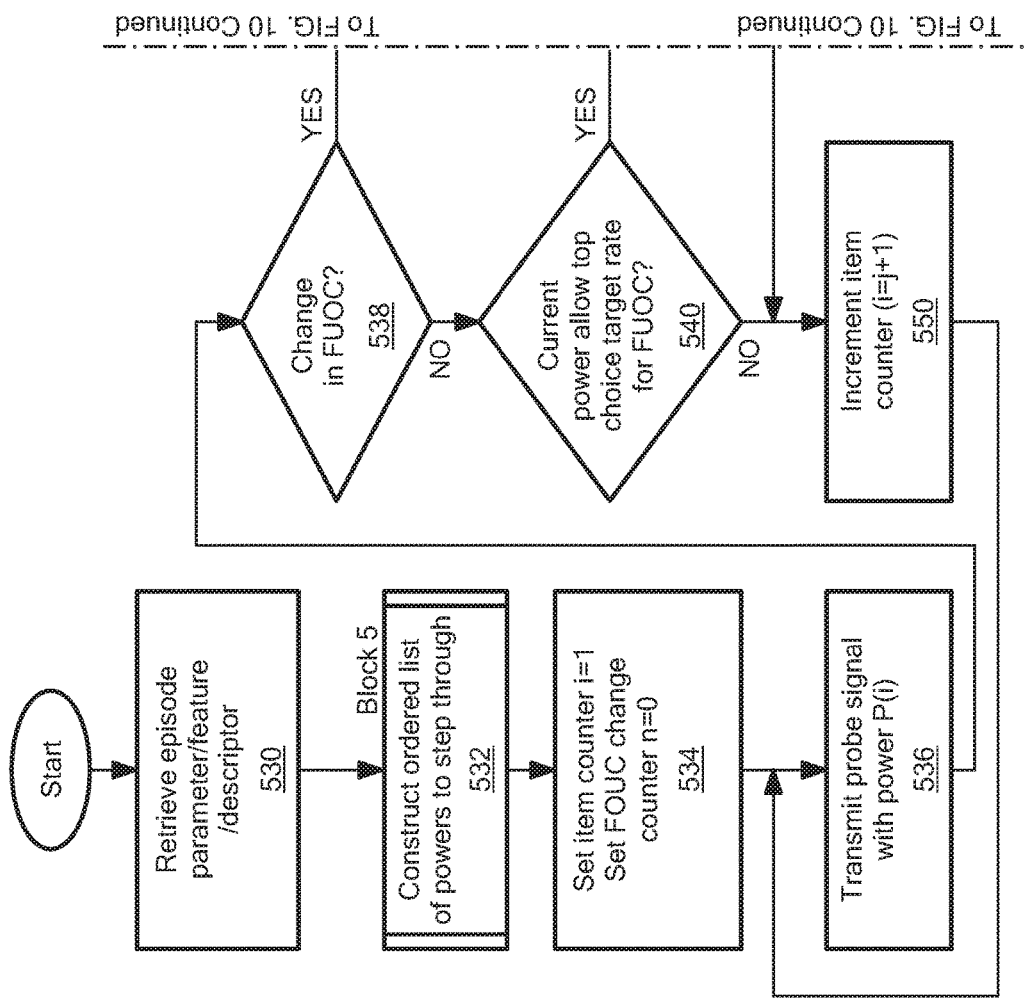
FIG. 10 is a flow diagram of an implementation of a list-based stepping probing procedure.
Figure 10:
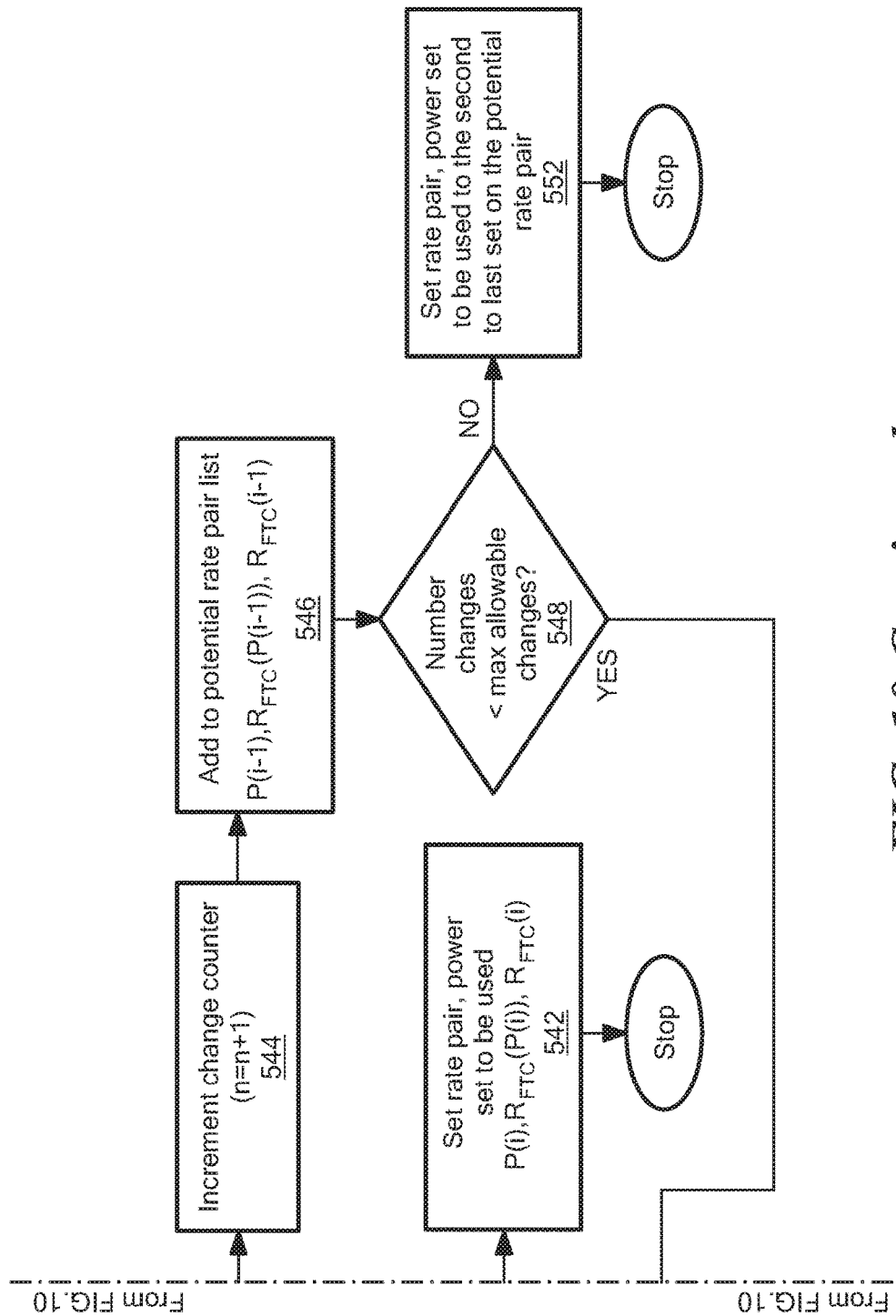

List-based stepping is described at the highest level with three simple instructions 1. Construct List of Powers immediately after SUOC radio's entrance into settling state
2. Step through list until FUOC reacts a set number of times
3. Return to operating point prior to final FUOC reaction FIG. 10 provides a detailed flow diagram with the details for either of the list-based settling methods. The difference between ignorant stepping probing and knowledge-based probing is completely encompassed by the different lists used for each of these methods. FIG. 10 illustrates an exemplary procedure that decision making unit 400 of FIG. 7 may implement for list-based stepping.

Referring to FIG. 10, processing begins in processing block 530 in which episode parameters, features and-/or descriptors are retrieved. Processing then proceeds to block 532 in which an ordered list of powers to step through is constructed. Processing then proceeds to processing blocks 534 and 536 in which an initialization process is performed and a probe signal with a selected power level is transmitted.

Processing then proceeds to decision block 538 in which a decision is made as to whether there has been a change in the target-FUOC. If no change is detected, then processing proceeds to decision block 540 in which it is determined as to whether a current power level allows a top choice target rate for the SUOC. If the current power level does not allow a top choice target rate for the SUOC, then processing proceeds to processing block 550 where the counter for a new power level is incremented and processing returns to processing block 536. The loop implemented by blocks 536, 538, 540, 550 is repeated until either a change in target-FUOC is detected in decision block 538 or a current power level allows a top choice target rate for the SUOC and is detected in decision block 540.

If in decision block 538 a decision is made that there has been a change in the target-FUOC, then processing proceeds to processing blocks 544 and 546 in which a change counter is implemented and the current SUOC power and corresponding rate that could be achieved in the presence of the target-FUOC with its most recent parameter values and MUD available in the receive-SUOC, the power-rate pair, is added to a list of potential power-rate pairs for the transmit SUOC. Processing then proceeds to decision block 548 in which a decision is made as to whether the number of changes is less than a maximum allowable number of changes. If in decision block 548 a decision is made that the number of changes is less than the maximum allowable number of changes, then processing returns to processing block 55 and processing proceeds as described above.

If in decision block 548 a decision is made that the number of changes is not less than the maximum allowable number of changes, then processing proceeds to processing block 552 where the power-rate pair and are set to be the second to last values that were set on the potential power-rate pair list. Processing then ends.

If in decision block 540 it is determined that a current power level allows a top choice target rate for the SUOC, then processing proceeds to processing block 542 where the power-rate pair are set to current values. Processing then ends.

Figure 10A:
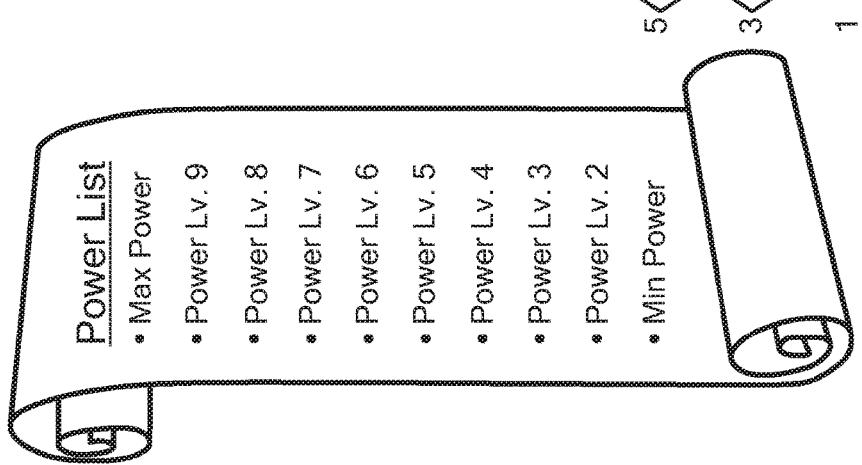
FIG. 10A is an exemplary use of the power list illustrating a step by step example of an outcome of each step of the list-based settling procedure as described in FIG. 10.

A step by step example of the outcome of each step of this procedure is next described in conjunction with FIG. 10A.

FIG. 10A is an example scenario using an exemplary power list. The example illustrates a the step by step list-based settling procedure and the outcome of each step for a fabricated case for which the maximum number of FUOC changes allowed is one. FIG. 10A shows that the FUOC will experience one change, after which, the SUOC and FUOC will have settled into a coexistence sharing of the same channel. Stated differently, FIG. 10A is an example of list-based stepping that makes use of a power list. It should be appreciated that the exemplary settling episode progression using a power list settling procedure of FIG. 10 is substantially the same independent of how the list was built.

1. Start probing with lowest power level on the list: power level=Min Power
2. FUOC signal made no changes perceptible to SUOC receiver;
3. Determine Next Power by moving up the list one entry: power level=Power Lv. 2
4. FUOC signal made no changes perceptible to SUOC receiver
5. Determine Next Power by moving up the list one entry: power level=Power Lv. 3
6. FUOC signal has been observed by SUOC receiver to have changed
7. Fallback: This is the power level that is "settled" upon for communication state. In this case example, settled power level=Power Lv. 2.

It should be noted that the number of FUOC moves before a fallback is a parameter may be set within the decision making unit 400 (FIG. 3 or 7) either done prior to radio deployment and/or updated during operation by a control decision made within the SUOC radio.

Figure 11:
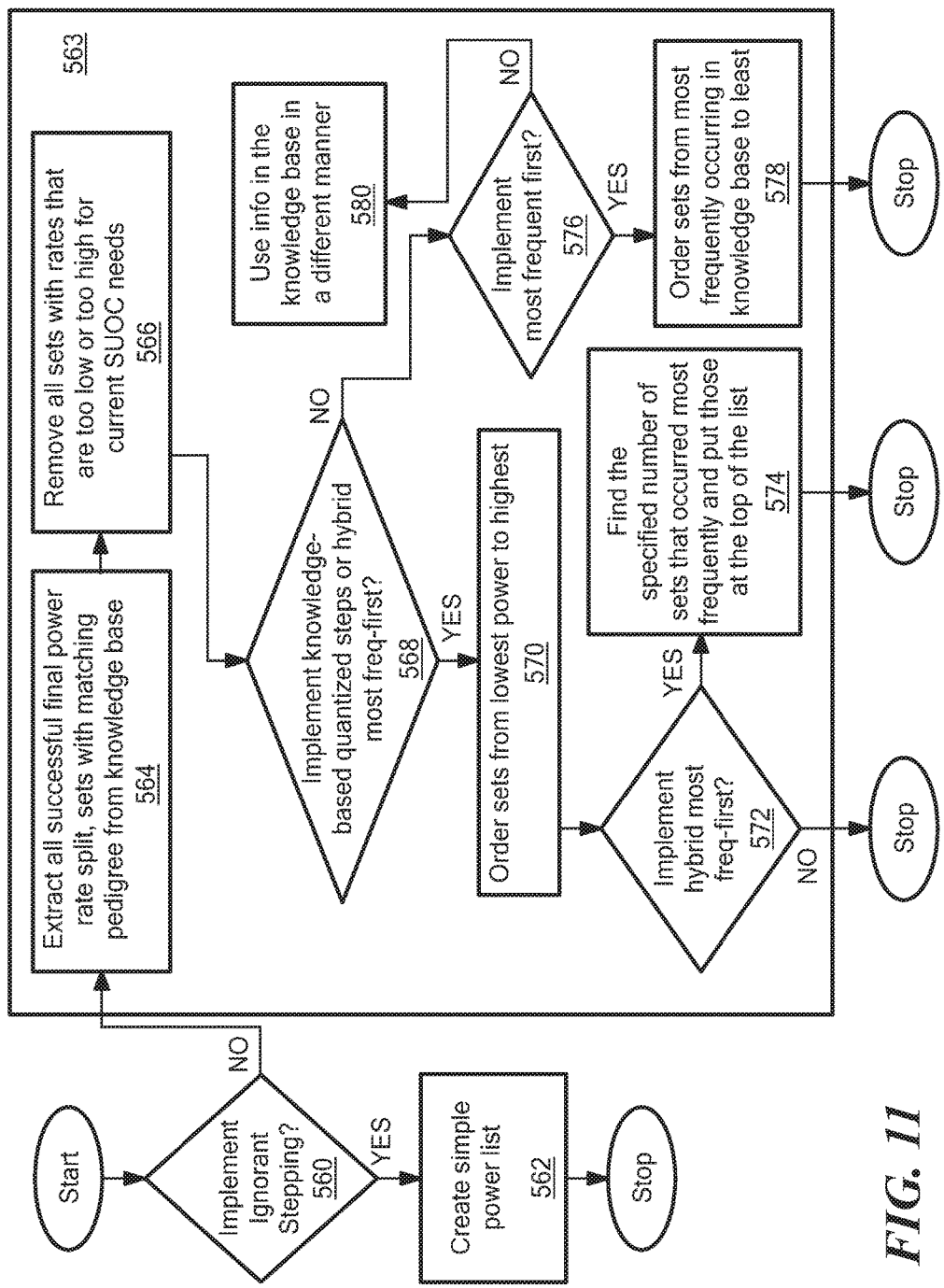

FIG. 11 is a flow diagram of a procedure that further defines processing block 532 in FIG. 10 (i.e., FIG. 11 is a flow diagram of a method of constructing the list to be used in the settling procedure or, stated differently, FIG. 11 illustrates a list building function). The portions of the diagram that are identified with reference numeral 563 provide a method for knowledge-based list building. Knowledge-based list building uses data collected from past interactions that the SUOC radio has experienced with FUOC radios that are described by past FUOC parameter values (pedigree) that resemble the current target-FUOC signal and scenario parameter values. The list building function as illustrated in FIG. 11 is capable of producing any type of list. Four different types of lists are implemented by the procedure described in FIG. 11:

1. Simple list (no use of prior knowledge);
2. Knowledge-based Power Ordered;
3. Knowledge-based Most Frequently Occurring Power to Least Frequently Occurring Power; and
4. Knowledge-based Hybrid Most-Frequent First (X most frequent successful powers followed by the rest in ascending power order).

Referring now to FIG. 11, processing begins in decision block 560 in which a decision is made as to whether ignorant stepping should be implemented. If a decision is made to implement ignorant stepping, then processing proceeds to processing block 562 in which a simple power list is created. Processing then ends.

If in decision block 560 a decision is made to not implement ignorant stepping, then a method for knowledge-based list building 563 as implemented by blocks 564-58 is used. The method for knowledge-based list building begins in processing block 564 in which all successful settling attempts (termed events) with matching pedigrees are extracted from the knowledge base. Processing then proceeds to processing block 566 in which all the extracted events with rates that are too low or too high for current SUOC needs are removed, as well as all events that correspond to transmit-SUOC transmit power that exceeds the operationally capable or allowable SUOC transmit power.

Processing then proceeds to decision block 568 in which a decision is made as to whether knowledge based quantized steps or a hybrid most frequent first technique will be implemented. If in decision block 568 a decision is made to implement knowledge based quantized steps or a hybrid most frequent first technique, then processing proceeds to processing block 570 in which the remaining events are grouped according to those with similar power values, the average power value for that group is used as the power value representing that group. Then the power values are ordered from lowest power to highest power. Processing then proceeds to decision block 572 in which a decision is made as whether a hybrid most frequent first should be implemented. If in decision block 572 a decision is made to not implement a hybrid most frequent first technique, processing then ends.

If in decision block 572 a decision is made to implement a hybrid most frequent first technique, then processing proceeds to processing block 574 in which the number of events contributing to a single power value is counted. The low to high power list is augmented by adding a specified number of power values above the top value on the list. Add to the top of this list the power values associated with the most populous event-groups. The specified number of spots to add at the top of this list can be predetermined or learned by the DMU 400 over time from examination of historical data. Processing then ends.

If in decision block 568 a decision is made to not implement knowledge based quantized steps or a hybrid most frequent first technique, then processing proceeds to decision block 576 in which a decision is made as to whether a most frequent first technique should be implemented. If in decision block 576 a decision is made to implement a most frequent first technique, then processing proceeds to processing block 578 in which the remaining events are grouped according to those with similar power values, the average power value for that group is used as the power value representing that group. Then the power values are ordered from the most frequently occurring to the least frequently occurring. Processing then ends.

If in decision block 576 a decision is made to not implement a most frequent first technique, then processing proceeds to processing block 580 in which other options for how to make use of what is the knowledge base can be used. One example would be to create a power list by using the information that has been collected in the knowledge base by finding only those events that match the current situation in one or two features as opposed to being a good match in all features (as we mean when we say "pedigree".) For example, the list of powers could be the list of powers that were settled into in past events for which the pedigree is a good overall match, but the time of day is the best match. So the first (second, third) power on the list would be the power that was settled into at the time of day that is closest (second closest, third closest) to the current time of day for all events in the knowledge base that are a good overall match in pedigree to the current situation.

Figure 12:
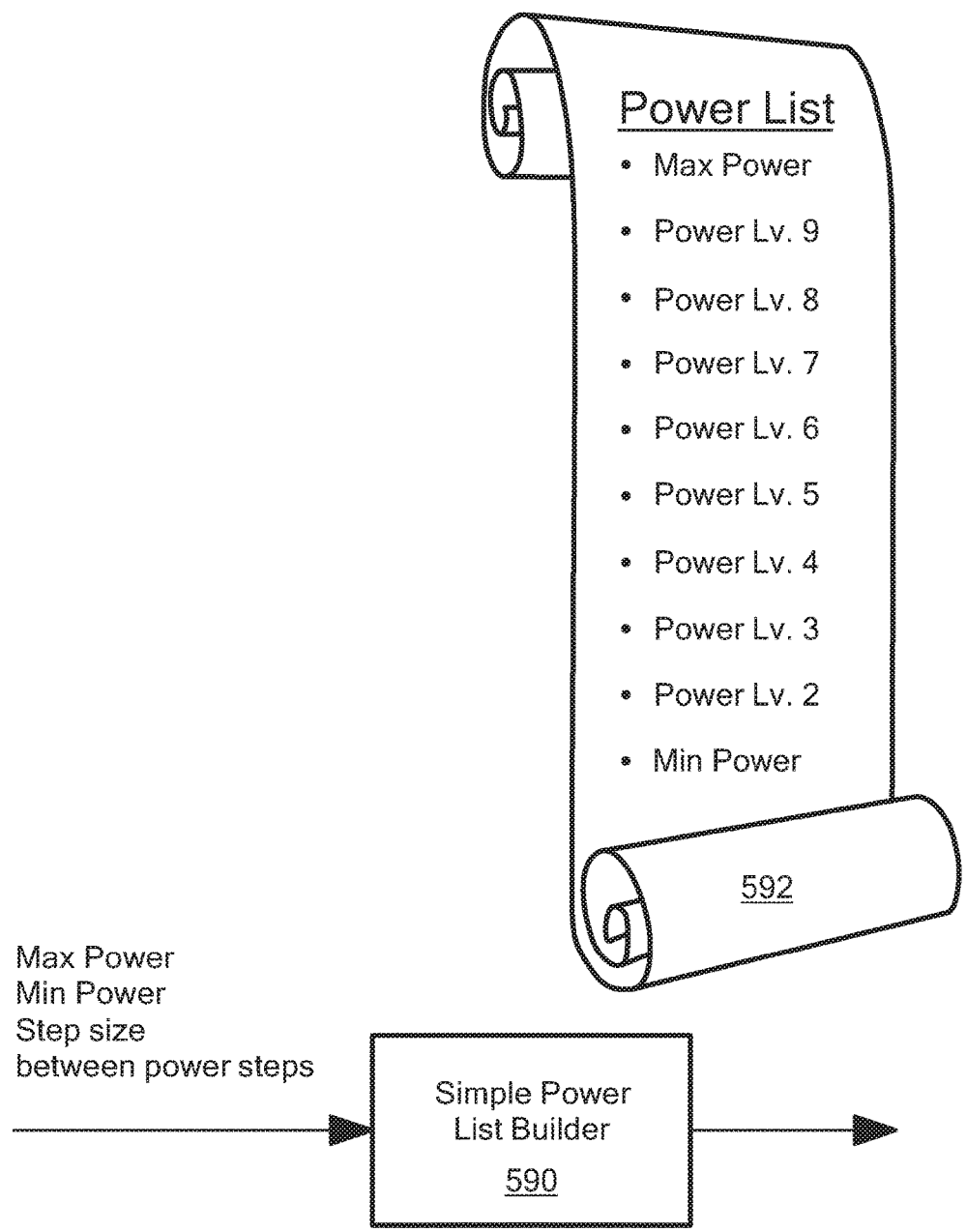
FIG. 12 is a block diagram of an ignorant list building procedure.

FIG. 12 is a block diagram of a list builder apparatus 590 that would reside within unit 400 of FIG. 7 to implement the simple list building function identified as element 562 in FIG. 11. A sample power list 592 includes a list of powers listed from a maximum power level to a minimum power level.

Figure 13:
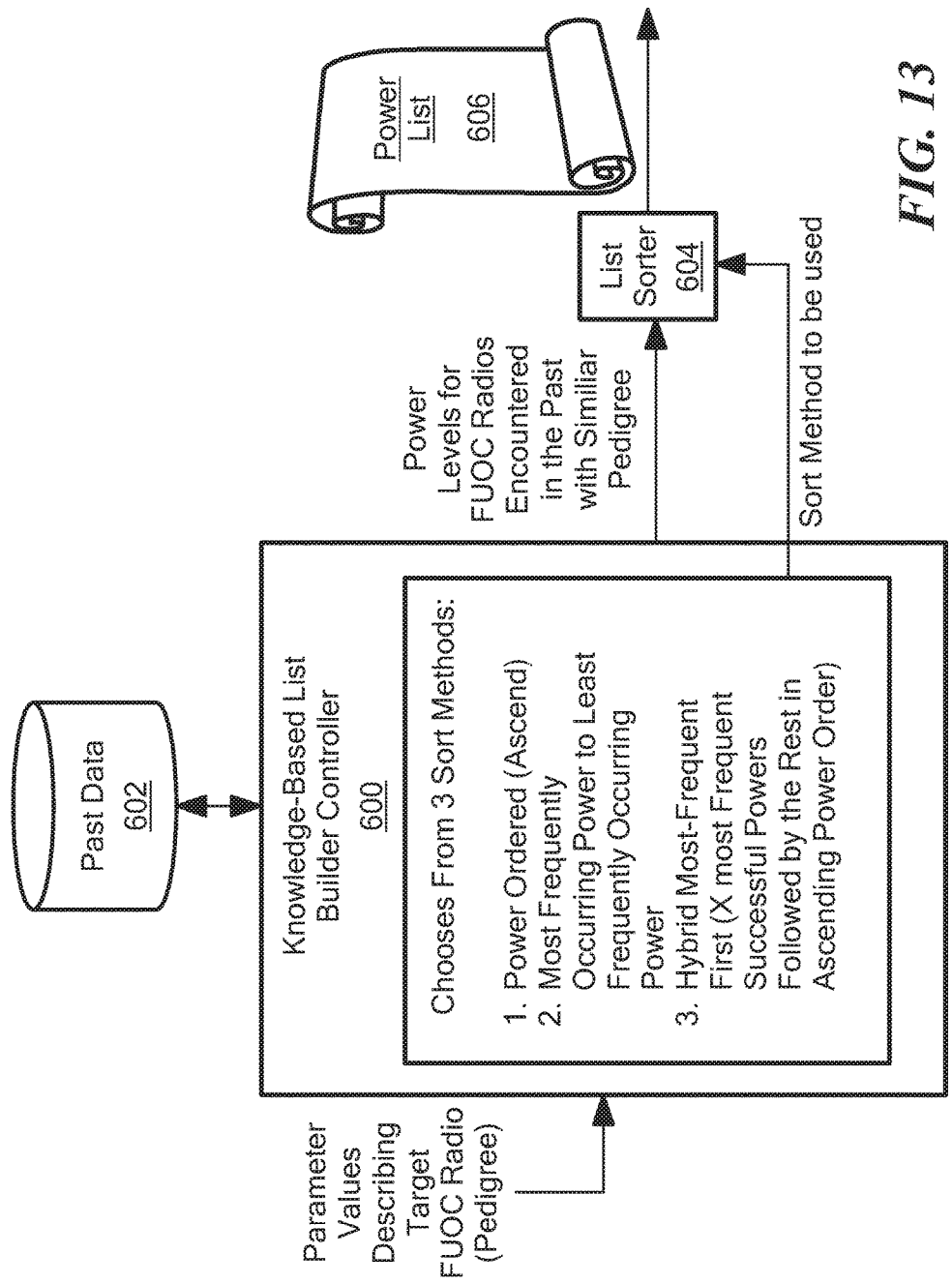
FIG. 13 is a diagram illustrating knowledge base power list building.
Figure 14:
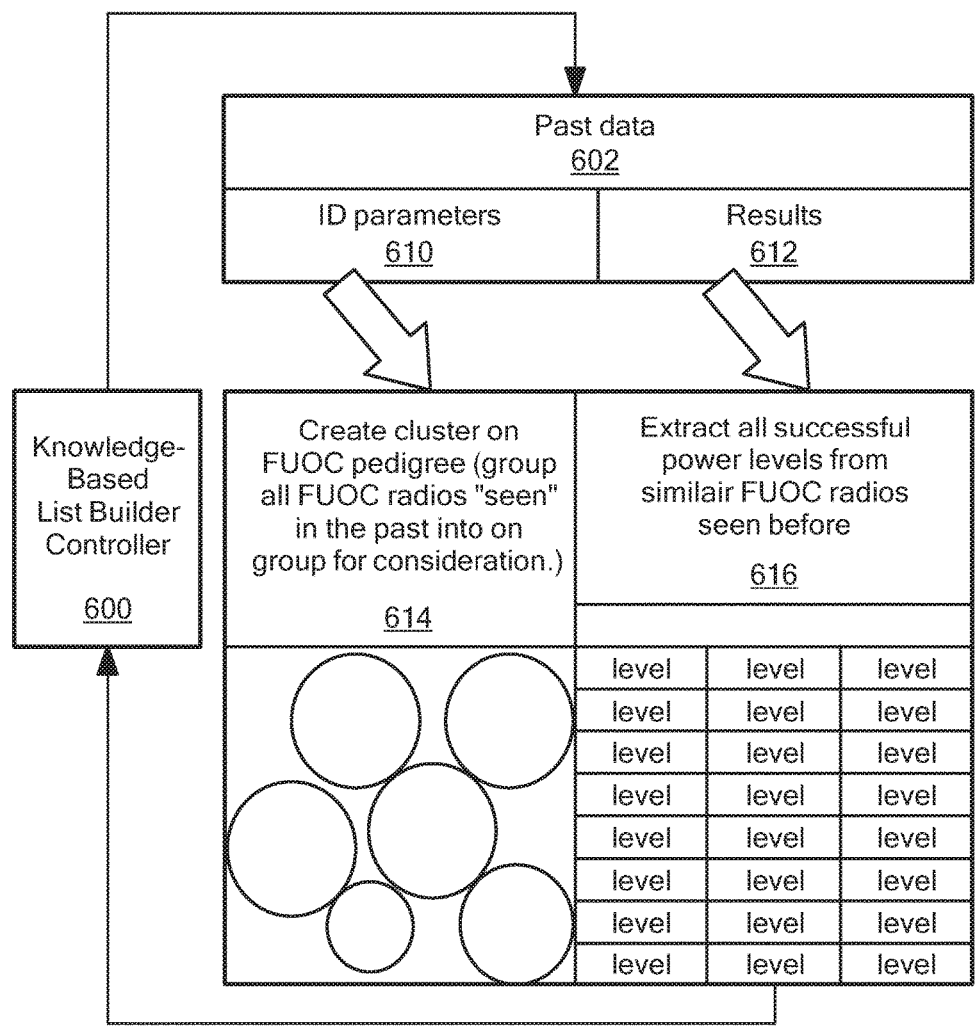
FIG. 14 is a diagram illustrating interaction between a knowledge base list builder controller and a data base.

FIGS. 13 and 14 illustrate the knowledge-based type of list building and provide a description of the knowledge based-sorting apparatus and operation that implements the method within block 563 in FIG. 11.

Referring now to FIG. 13, a knowledge list controller 600 is coupled to a data store 602 (e.g. database) having past data stored therein and a list sorter 604. Knowledge list controller 600 receives parameter values describing target-FUOC signal and scenario information (e.g. pedigree information) and also exchanges data with data store 602. In response to the information provided thereto, knowledge list controller 600 provides to list sorter 604 power levels for FUOC radios encountered in the past with similar pedigree and also one or more sort methods to be used. In response thereto, list sorter 604 generates a power list 606.

Referring now to FIG. 14 in which like elements of FIG. 13 are provided having like reference designations, knowledge list controller 600 is coupled to data store 602 which includes ID parameters 610 and results 612. The ID parameters 610 contain target-FUOC pedigree parameters (including, but not limited to FUOC identifiers and frequency). Results portion 612 of data store 62 contains results from past settling attempts with each FUOC (including, but not limited to, final successful SUOC power, rate, other settling process and/or outcome details, etc . . . ). The ID parameters are used to create clusters on FUOC pedigree 614 and the results 612 are used to extract all successful power levels from similar FUOC signals and scenarios seen before 616.

As mentioned above, reactive stepping is the third method that could be used in the settling process and can be described at the highest level with two instructions: (1) after each interaction round within the settling process, re-evaluate the transmit-SUOC's probing signal power and possibly calculate a new value to use in next interaction; and (2) iteratively adjust this transmit power until a high rate falling between $R_{a,max}$ (the maximum desired rate) and $R_{a,min}$ (the minimum acceptable rate), has been achieved without causing more than a previously designated number of negative changes in the target-FUOC's signal.

Some details of exemplary steps to perform a reactive stepping settling procedure were described above.

Another reactive-type probing procedure is detailed below. This is different than the reactive probing procedure discussed above and is called the guided step probing procedure. Similarly to the reactive probing procedure, the guided step probing technique involves determining the SUOC operation point by observing the FUOC's response to a probe signal. However this procedure utilizes a two phase process to first heuristically determine a target transmit-SUOC rate and second to analytically determine a transmit-SUOC receive SNR level that allows for achievement of that rate. This process is iterative, converging to a solution after a few probing interactions. This guided stepping settling process takes the approach of entering the target-FUOC's channel with a minimum power level and building up to a higher power level as is possible given any changes that occur in the FUOC's modulation rate and/or power during this settling process. The guided step probing procedure is detailed below.

Step 1: Initialize three regions of rate values to be used in the guided step settling process. Two rates, one the excessive rate, the other the minimum rate, provide the separating values for three rate regions: the Achieve Minimum region, the Joint Consideration region, and the Excessive region. The Achieve Minimum region contains all rates less than the provided minimum. The Joint Consideration region contains rates between the two given levels of minimum rate and excessive rate. The Excessive region contains rates greater than the excessive level. The excessive rate level is predetermined as the maximum rate that would be required by a SUOC to fully achieve the target application (e.g. voice, video) with the best quality possible. The minimum rate level is predetermined as the minimum rate that would be required by a SUOC to acceptably achieve the target application (e.g. voice, video) with the lowest quality allowable.

Step 2: Initialize an upper and lower rate bound that will change iteratively in response to the guided stepping and any changes in the target-FUOC SNRA and modulation. The bounds guide the development of transmit-SUOC target rate determination. The bottom bound is initially set to the minimum rate level and the top bound is initially set to the excessive rate level.

Step 3: Determine the first value for the previously determined achievable transmit-SUOC rate that is used in the guided stepping settling process. First, the DMU 400 submits a request to RDFGU 300 along path 150 for the RDFGU 300 to compute the transmit-SUOC SNRa that would be needed to achieve the minimum acceptable transmit-SUOC rate which has been pre-determined as part of the specification of the SUOC radio for each data payload type. The current target-FUOC SNRA and modulation must also be passed along path 150 to RDFGU 300 in order for the RDFGU 300 to compute the necessary SNRa that would support the minimum acceptable rate. Second, the transmit-SUOC transmits a probe signal at the power necessary to result in the determined SNRa that corresponds to the minimum acceptable rate to be achieved at the receive-SUOC. If the transmit-SUOC's signal interferes with the FUOC in any way, the FUOC will make some form of adjustment at this time to overcome the degraded signal quality due to the new level of interference. Third, the DMU 400 submits a request along path 155 to the RFCU 200 to provide estimates of the target-RFSCU modulation and SNRA. Fourth, with these values for the target-FUOC SNRA and modulation (and if applicable, combined coding and modulation rate), the DMU 400 submits a request to the RDFGU 300 over path 150 to request the transmit-SUOC achievable rate with the MUD available in the receive-SUOC. It is this value that is used as the first value for previously determined achievable rate in the guided stepping process.

Step 4: The top and bottom bounds are adjusted according to the following rules: A) if the previously determined achievable rate is in the Achieve Minimum region the new target rate is the current bottom bound. If the previously determined achievable rate is in the Excessive region the new target rate is the current top bound. B) If the previously determined achievable rate is in the Joint Consideration region, the new target rate is a weighted average of the top and bottom bound. C) If the previously determined achievable rate is greater than the midpoint of the top and bottom bounds, the bottom bound is adjusted to a scaled version of the previously determined achievable rate. The top bound is adjusted in a similar fashion if the previously achieved rate is less than the midpoint of the bounds.

Step 5: A new SUOC target rate is determined based on the previously determined achievable rate a given excessive rate level, a given minimum level, a top bound, and a bottom bound. The previously determined achievable rate is defined to be the last achievable rate from this iterative guided stepping settling process that was confirmed to be implementable with the given MUD, as determined by the RDFGU 300 based upon the most recent SRNa, SNRa, and FUOC modulation (or, if the receive-SUOC has access to the FUOC's code book and can implement the additional error correction decoder, then the FUOC's rate would be the combination of the modulation and code rate) values. The new SUOC target rate could be determined inany number of ways, to include the following: the midpoint between the top and bottom bounds, a weighted average of the top and bottom bounds, a value that falls between the top and bottom bounds by some fraction, etc.

Step 6: Determine the next transmit-SUOC probing power. This new SUOC target rate is fed to RDFGU 300 along with the current values of FUOC SNRA and modulation and a request to return the SNRa necessary to achieve this target rate with the given MUD. The DMU 400 computes the transmit-SUOC transmit power that corresponds to the SNRa value returned by the RDFGU 300 and sends the necessary control signals to unit 500 to accomplish the next step in this process.

Step 7: The transmit-SUOC transmits a probe signal at the power necessary for the most recently computed target transmit-SUOC rate to be achieved at the receive-SUOC with the given MUD. If the transmit-SUOC's signal interferes with the FUOC in anyway, the FUOC will adjust at this time.

Step 8: Determine the next value of the previously determined achievable rate. The DMU 400 submits a request along path 155 to the RFSCU 200 to provide estimates of the FUOC modulation (or combination of modulation and rate) and SNRA. With these values for the FUOC SNRA and modulation (or combination of modulation and rate), the DMU 400 submits a request to the RDFGU 300 over path 150 to request the achievable rate possible with the MUD available in the receive-SUOC. It is this value that is used as the next value for the previously determined achievable rate in the guided stepping process.

Step 9: Log any condition parameters at this time. If a pre-determined condition is met, stop the guided stepping settling process and transition the receive SUOC into the communication state. Otherwise, continue this process by going to step 4.

Note that a slight variation in this guided stepping settling process can be achieved by a simple change in the step to determine the first power used for transmit-SUOC probing. During the first probe transmission by the SUOC, an initial power level is used for this calculation. This initial power could simply be the typical operating power of the transmit-SUOC or it could be either a value derived from the knowledge base based upon historically good first values or could be a pre-determined initial power or initial pro-rating of the typical power to allow for a gentler settling process with the FUOC.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. In a network having multiple first user on channel (FUOC) radios and multiple second user on channel (SUOC) radios, a method for allowing a SUOC radio to co-occupy a radio frequency (RF) band with a FUOC radio, the method comprising:
   (a) identifying at least one other SUOC radio with which a first SUOC radio is to communicate;
   (b) scanning an RF environment for RF bands that are currently occupied by the FUOC radios;
   (c) collecting signal parameters associated with the RF bands that are currently occupied by the FUOC radios;
   (d) analyzing the signal parameters associated with the RF bands that are currently occupied by the FUOC radios to identify data rates that may be used by the first SUOC radio if it co-occupies the RF bands with a corresponding FUOC radio; and
   (e) selecting an RF band to co-occupy with the corresponding FUOC radio based, at least in part, on the identified data rates, wherein the FUOC radio currently occupying the selected RF band is a target FUOC radio;
   (f) transmitting RF signals from the at least one other SUOC radio to the first SUOC radio within the selected RF band at a series of increasing power levels while observing operation of the target FUOC radio to identify any predetermined level of changes in behavior of the target FUOC radio; and
   (g) selecting a SUOC transmit power level based, at least in part, on a power level that causes a predetermined level of change in behavior of the target FUOC radio.

2. The method of claim 1, further comprising:
attempting to select a data rate that permits acceptable co-occupation of the selected RF band with the target FUOC radio; and
if a suitable data rate is found, establishing a communication connection between the first SUOC radio and the at least one other SUOC radio using the selected data rate and power level.

3. The method of claim 2, wherein:
establishing a communication connection between the first SUOC radio and the at least one other SUOC radio includes activating a MUD receiver in the first SUOC radio to remove interference associated with the target FUOC radio from signals received from the at least one other SUOC radio.

4. The method of claim 2, wherein:
establishing a communication connection between the first SUOC radio and the at least one other SUOC radio includes using error correction coding in the first SUOC radio to remove errors in received data caused by interference associated with the target FUOC radio.

5. The method of claim 2, wherein:
establishing a communication connection between the first SUOC radio and the at least one other SUOC radio includes using multiple input, multiple output (MIMO) techniques to reduce the effect of interference associated with the target FUOC radio when processing RF signals received from the at least one other SUOC radio.

6. The method of claim 2 further comprising:
if the communication connection between the first SUOC radio and the at least one other SUOC radio is later disrupted, entering a threatened state to identify a new target FUOC radio.

7. The method of claim 2 further comprising:
if a suitable data rate is not found, entering a threatened state to identify a new target FUOC radio.

8. The method of claim 2, wherein:
identifying at least one other SUOC radio to which the first SUOC radio is to communicate includes maintaining a list of SUOC radios that are one hop neighbors of the first SUOC radio.

9. The method of claim 2, wherein:
identifying, scanning, collecting, analyzing, and selecting are performed at the first SUOC radio.

10. In a network having multiple first user on channel (FUOC) radios and multiple second user on channel (SUOC) radios, a method for allowing a SUOC radio to co-occupy a radio frequency (RF) band with a FUOC radio, the method comprising:
   (a) identifying at least one other SUOC radio with which a first SUOC radio is to communicate;
   (b) scanning an RF environment for RF bands that are currently occupied by the FUOC radios;
   (c) collecting signal parameters associated with the RF bands that are currently occupied by the FUOC radios;
   (d) analyzing the signal parameters associated with the RF bands that are currently occupied by the FUOC radios to identify data rates that may be used by the first SUOC radio if it co-occupies the RF bands with a corresponding FUOC radio;

(e) selecting an RF band to co-occupy with the corresponding FUOC radio based, at least in part, on the identified data rates, wherein the FUOC radio currently occupying the selected RF band is a target FUOC radio; and (f) iterating data rates and power levels used to transmit RF signals from the at least one other SUOC radio to the first SUOC radio within the selected RF band until a suitable data rate and power level is found that permits acceptable co-occupation of the selected RF band with the target FUOC radio.

11. The method of claim 10, further comprising:
if a suitable data rate and power level is found, establishing a communication connection between the first SUOC radio and the at least one other SUOC radio using the identified data rate and power level.

12. The method of claim 11, wherein:
establishing a communication connection between the first SUOC radio and the at least one other SUOC radio includes activating a MUD receiver in the first SUOC radio to remove interference associated with the target FUOC radio from signals received from the at least one other SUOC radio.

13. The method of claim 11, wherein:
establishing a communication connection between the first SUOC radio and the at least one other SUOC radio includes using error correction coding in the first SUOC radio to remove errors in received data caused by interference associated with the target FUOC radio.

14. The method of claim 11, wherein:
establishing a communication connection between the first SUOC radio and the at least one other SUOC radio includes using multiple input, multiple output (MIMO) techniques to reduce the effect of interference associated with the target FUOC radio when processing RF signals received from the at least one other SUOC radio.

15. The method of claim 11 further comprising:
if the communication connection between the first SUOC radio and the at least one other SUOC radio is later disrupted, entering a threatened state to identify a new target FUOC radio.

16. The method of claim 10 further comprising:
if a suitable data rate and power level is not found, entering a threatened state to identify a new target FUOC radio.

17. The method of claim 10, wherein:
identifying at least one other SUOC radio to which the first SUOC radio is to communicate includes maintaining a list of SUOC radios that are one hop neighbors of the first SUOC radio.

18. The method of claim 10, wherein:
identifying, scanning, collecting, analyzing, and selecting are performed at the first SUOC radio.

* * * * *